(12) United States Patent
Eum et al.

(10) Patent No.: US 10,027,876 B2
(45) Date of Patent: Jul. 17, 2018

(54) MOBILE TERMINAL AND METHOD FOR CONTROLLING THE SAME

(71) Applicant: LG ELECTRONICS INC., Seoul (KR)

(72) Inventors: Hyomin Eum, Seoul (KR); Younghoon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/427,549

(22) Filed: Feb. 8, 2017

(65) Prior Publication Data

US 2017/0289427 A1 Oct. 5, 2017

(30) Foreign Application Priority Data

Mar. 31, 2016 (KR) .................. 10-2016-0039589

(51) Int. Cl.
| | |
|---|---|
| *H04N 5/232* | (2006.01) |
| *H04N 5/247* | (2006.01) |
| *H04N 5/272* | (2006.01) |
| *G06F 3/0481* | (2013.01) |
| *G06F 3/0484* | (2013.01) |
| *G06F 3/0488* | (2013.01) |

(52) U.S. Cl.
CPC ..... *H04N 5/23206* (2013.01); *H04N 5/23216* (2013.01); *H04N 5/23293* (2013.01); *H04N 5/247* (2013.01); *H04N 5/272* (2013.01); *G06F 3/04817* (2013.01); *G06F 3/04842* (2013.01); *G06F 3/04883* (2013.01); *G06F 3/04886* (2013.01); *H04N 5/23245* (2013.01)

(58) Field of Classification Search
CPC ............ G06F 3/04817; G06F 3/04842; G06F 3/04883; H04N 5/23206; H04N 5/23216
See application file for complete search history.

(56) References Cited

U.S. PATENT DOCUMENTS

| | | | |
|---|---|---|---|
| 2011/0181683 A1* | 7/2011 | Nam .................. | H04N 5/44513 348/14.07 |
| 2014/0068478 A1* | 3/2014 | Won ..................... | G06F 3/0488 715/765 |

(Continued)

FOREIGN PATENT DOCUMENTS

JP 2014-131200 A 7/2014

*Primary Examiner* — Trung Diep
(74) *Attorney, Agent, or Firm* — Birch, Stewart, Kolasch & Birch, LLP

(57) ABSTRACT

A mobile terminal including a camera; a wireless communication processor configured to provide wireless communication; a display; and a controller configured to display a first preview image on the display corresponding to image data input through the camera, detect an external device located within a preset range of the mobile terminal via the wireless communication processor, display an icon on the display corresponding to the detected external device by overlapping the first preview image, execute a communication connection with the external device, in response to a touch input applied to the icon, while the communication with the detected external device is not connected, and release the communication connection with the external device, in response to the touch input applied to the icon, while the communication with the detected external device is connected.

18 Claims, 37 Drawing Sheets

(56) References Cited

U.S. PATENT DOCUMENTS

| | | | |
|---|---|---|---|
| 2014/0358990 A1 | 12/2014 | Huang et al. | |
| 2015/0319353 A1* | 11/2015 | Kaneda | H04N 5/23206 348/211.2 |
| 2015/0350296 A1* | 12/2015 | Yang | H04L 67/025 715/740 |
| 2016/0142638 A1* | 5/2016 | Nishizaka | H04N 5/23229 348/207.11 |

* cited by examiner

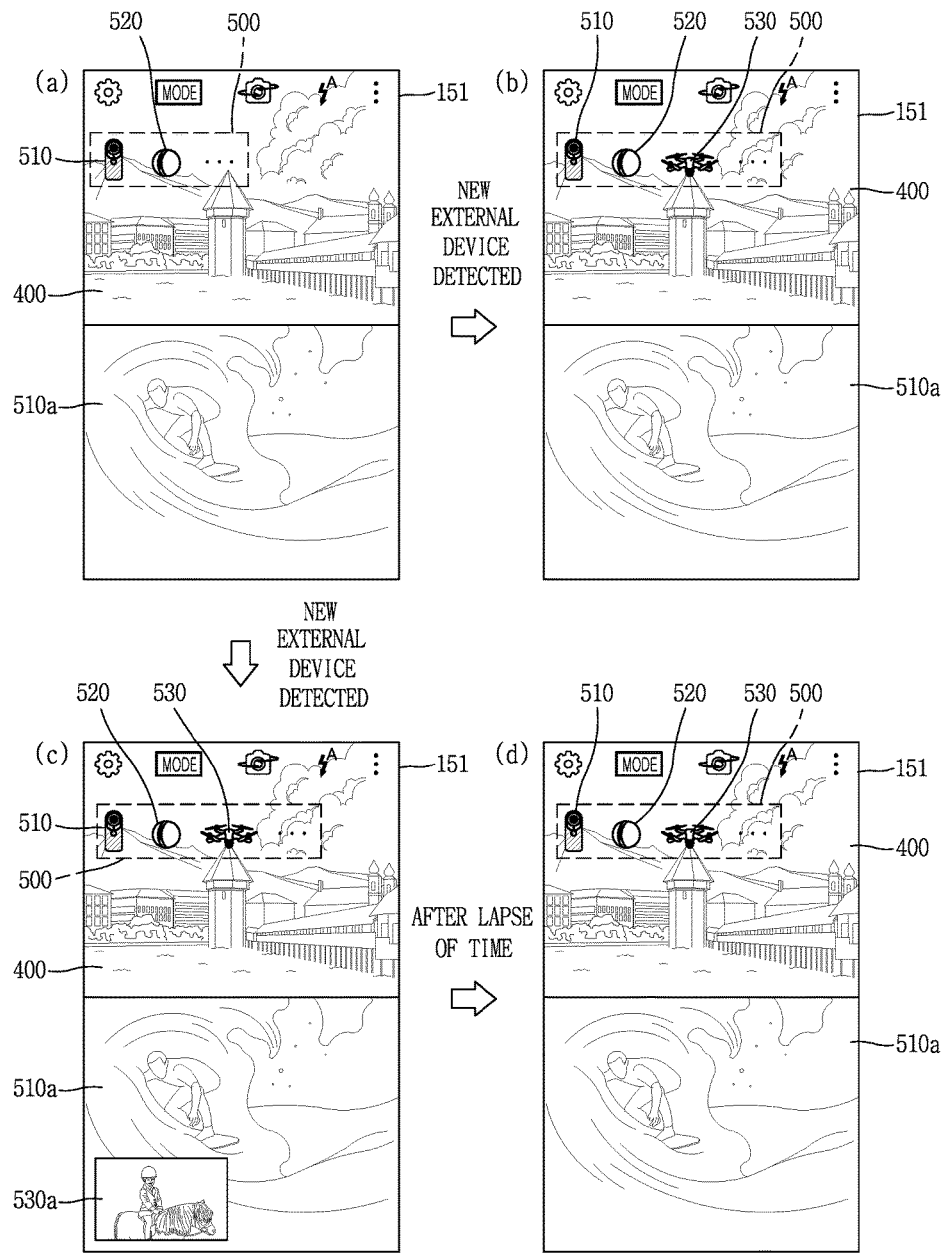

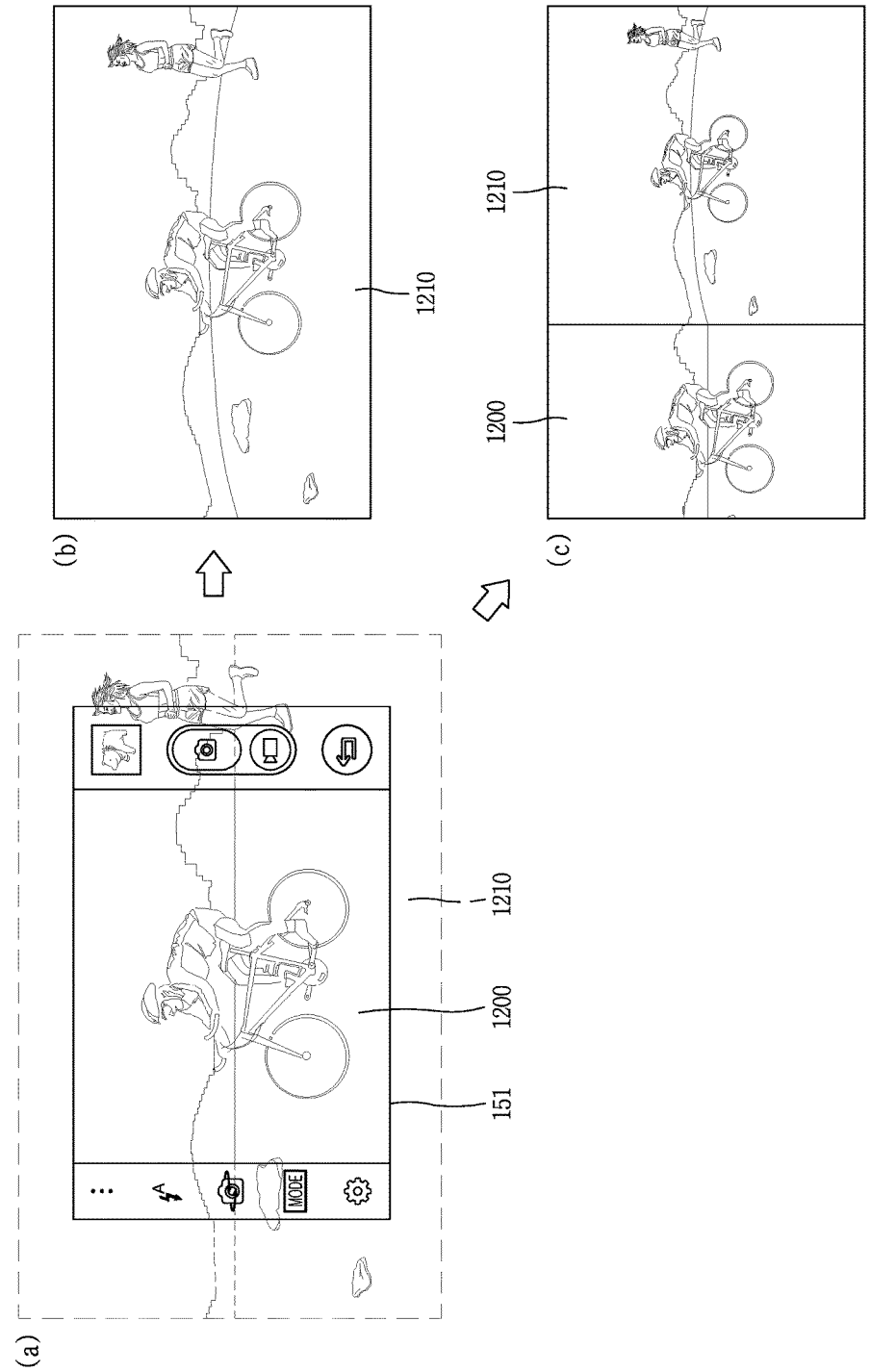

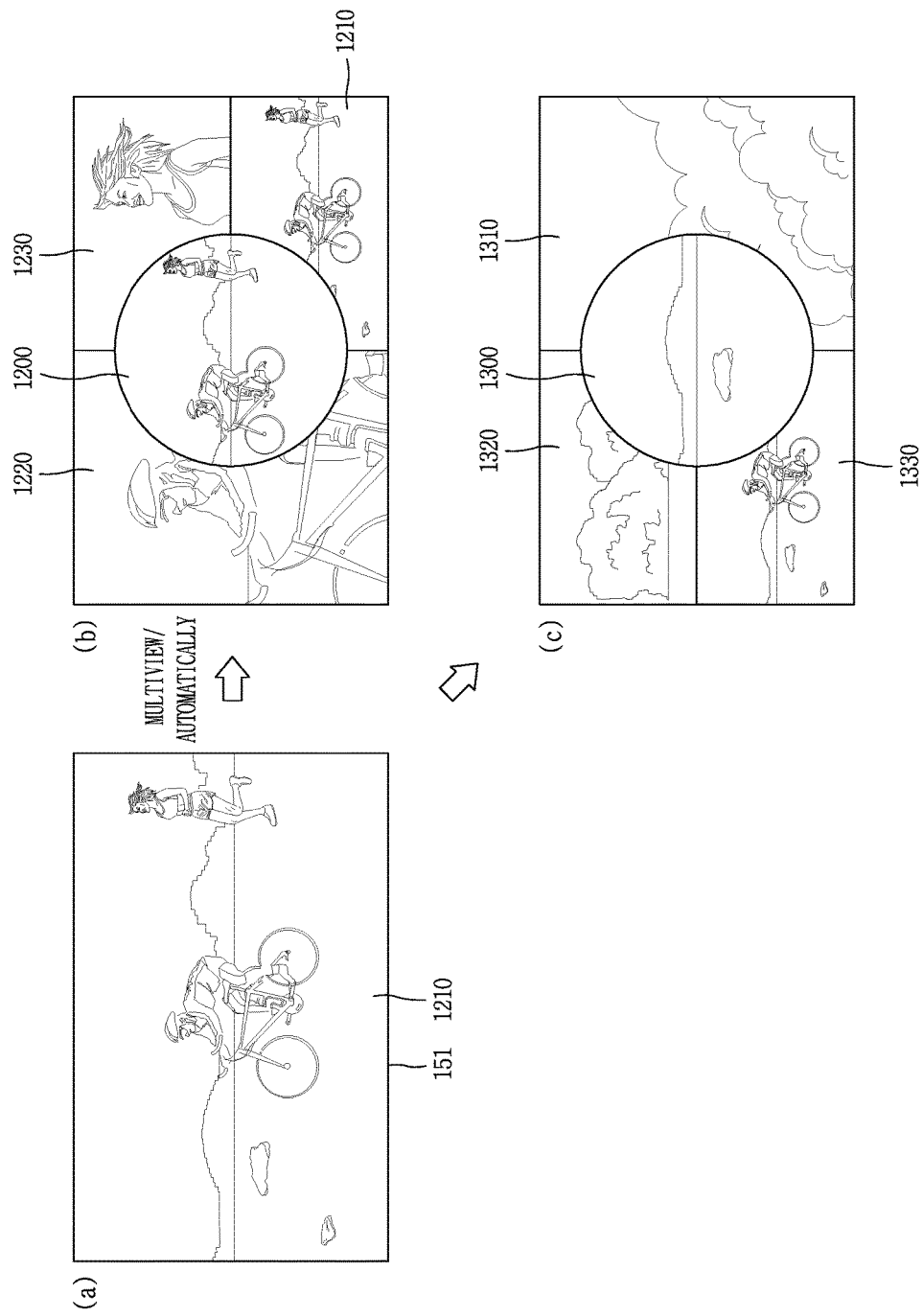

FIG. 11C
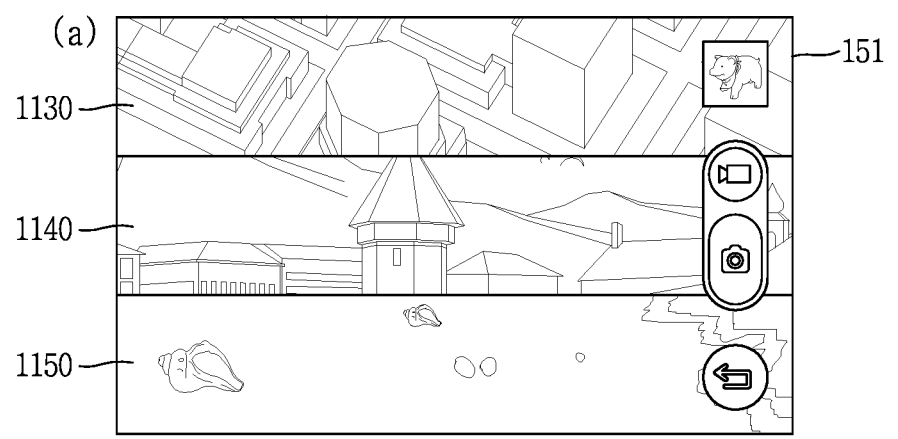
DEVICE CONNECTION RELEASED
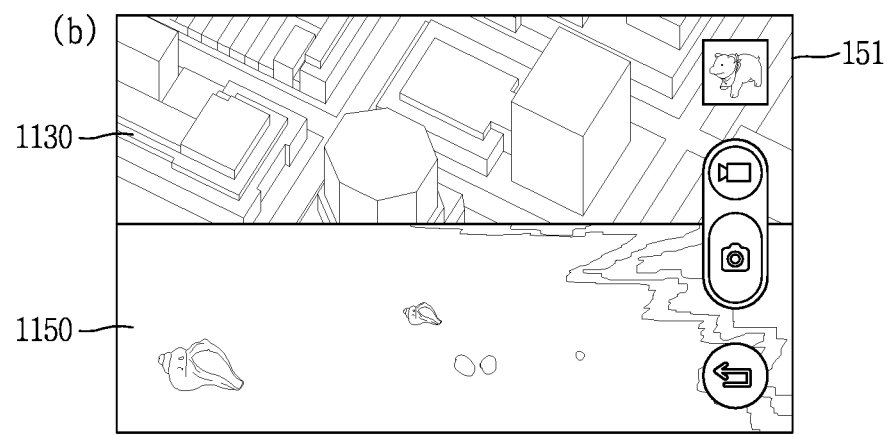

FIG. 11D
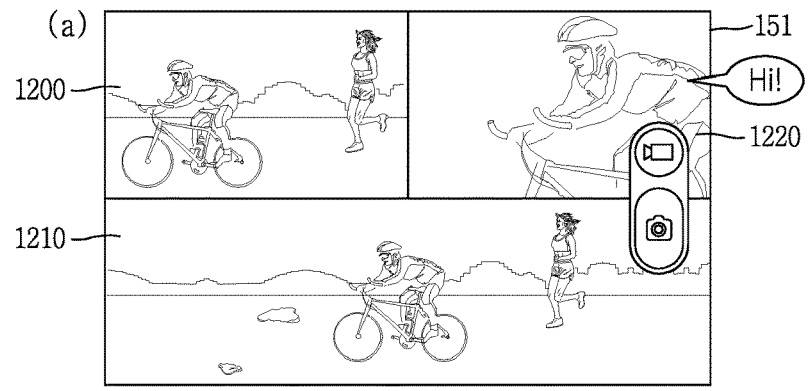
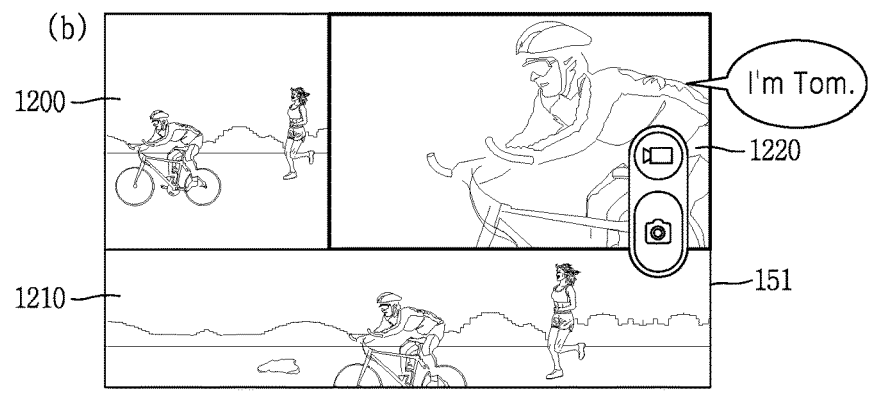
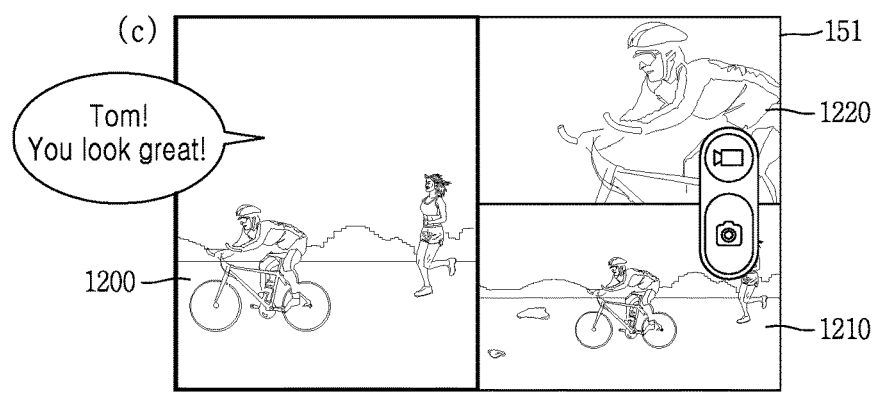

FIG. 13B
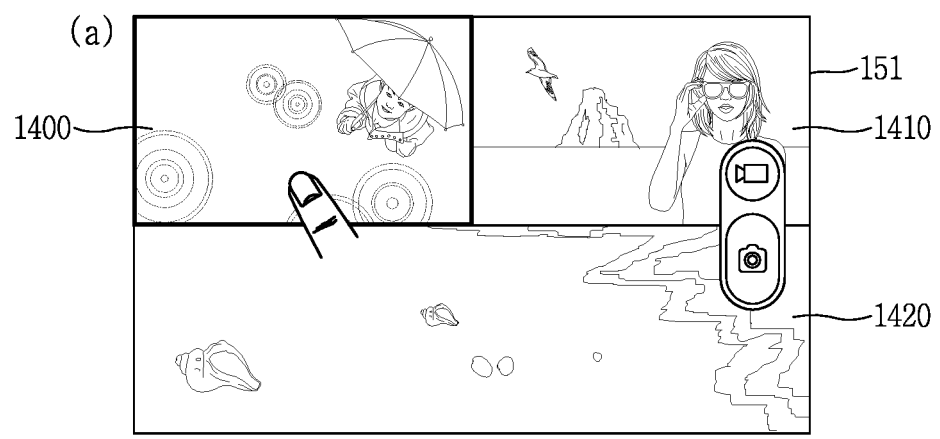

FIG. 15B
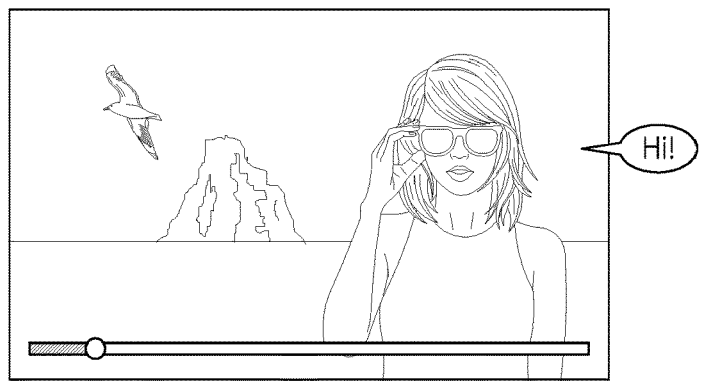
(a)
(b) 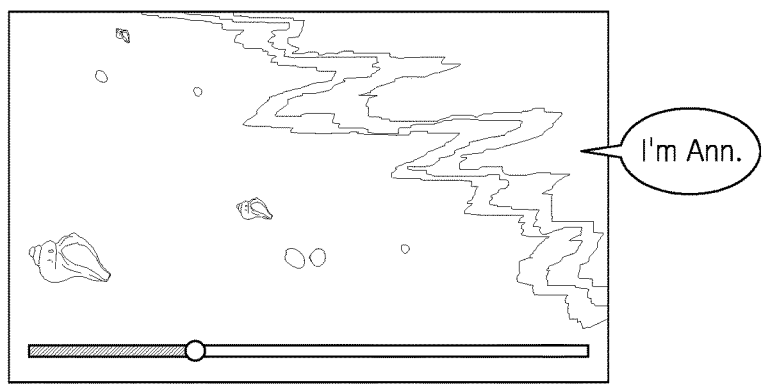
(c) 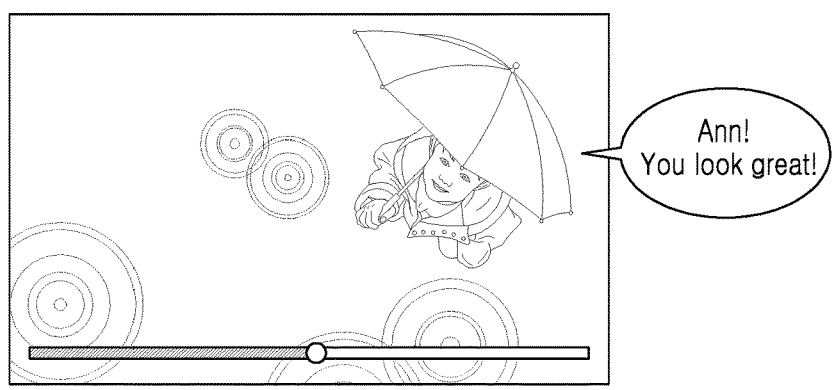

MOBILE TERMINAL AND METHOD FOR CONTROLLING THE SAME

CROSS-REFERENCE TO A RELATED APPLICATION

Pursuant to 35 U.S.C. § 119(a), this application claims the benefit of an earlier filing date of and the right of priority to Korean Application No. 10-2016-0039589, filed on Mar. 31, 2016, the contents of which are incorporated by reference herein in its entirety.

BACKGROUND OF THE INVENTION

1. Field of the Invention

This specification relates to a mobile terminal capable of receiving images from cameras provided in a plurality of external devices, and a method for controlling the same.

2. Background of the Invention

Terminals may be divided into mobile/portable terminals and stationary terminals. Also, the mobile terminals may be classified into handheld terminals and vehicle mount terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In recent time, as one effort of expanding functions of a mobile terminal, technologies of providing various functions by establishing communication links between the mobile terminal and other electronic devices are under development. However, the related art technology has problems of a complicated communication establishing process between the mobile terminal and other electronic devices, and difficulty in controlling the electronic devices through the mobile terminal even though the communication links are established with the electronic devices. Due to such problems, a requirement for a method of more intuitively controlling the communication links (connections) and the communication-linked (connected) devices are gradually increasing in mobile terminal industrial fields.

SUMMARY OF THE INVENTION

Therefore, an aspect of the detailed description is to extend a camera function of a mobile terminal through communication established (connected, linked) between the mobile terminal and an external device.

Another aspect of the detailed description is to increase user convenience in connecting (establishing) communications between a mobile terminal and an external device.

Another aspect of the detailed description is to provide a method of intuitively controlling a mobile terminal and an external device with communication established therebetween.

Another aspect of the detailed description is to provide various visual effects (interests) using a mobile terminal and an external device.

To achieve these and other advantages and in accordance with the purpose of this specification, as embodied and broadly described herein, there is provided a mobile terminal, including a camera, a wireless communication unit configured to detect a communication-available external device that is located within a preset range, the wireless communication unit performing communication with the communication-available external device, a display unit configured to output a preview image corresponding to image data input through the camera, and a controller configured to output an icon corresponding to the detected external device by overlapping the preview image corresponding to the image data input through the camera, wherein the controller performs a communication connection with the external device, in response to a touch input applied to the icon, while the communication with the detected external device is not connected, and wherein the controller releases the communication connection with the external device, in response to a touch input applied to the icon, while the communication with the detected external device is connected.

To achieve these and other advantages and in accordance with the purpose of this specification, as embodied and broadly described herein, there is provided a method for controlling a mobile terminal, the method including outputting a preview image of image data input through a camera on a display unit, detecting a communication-available external device located within a preset range while the preview image is output, outputting an icon corresponding to the detected external device on the preview image in an overlapping manner, performing a communication connection with the detected external device, in response to a touch input applied to the icon, when the mobile terminal is not in the communication-connected state with the detected external device, and releasing the communication connection with the detected external device, in response to a touch input applied to the icon, when the mobile terminal is in the communication-connected state with the detected external device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 5 is a conceptual view illustrating a method of controlling a mobile terminal when a new external device is detected;

FIGS. 8A to 8E are conceptual views illustrating a method of outputting preview images of communication-connected external devices in a second mode;

FIGS. 11A to 11D are conceptual views illustrating embodiments in which a layout of preview images changes;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
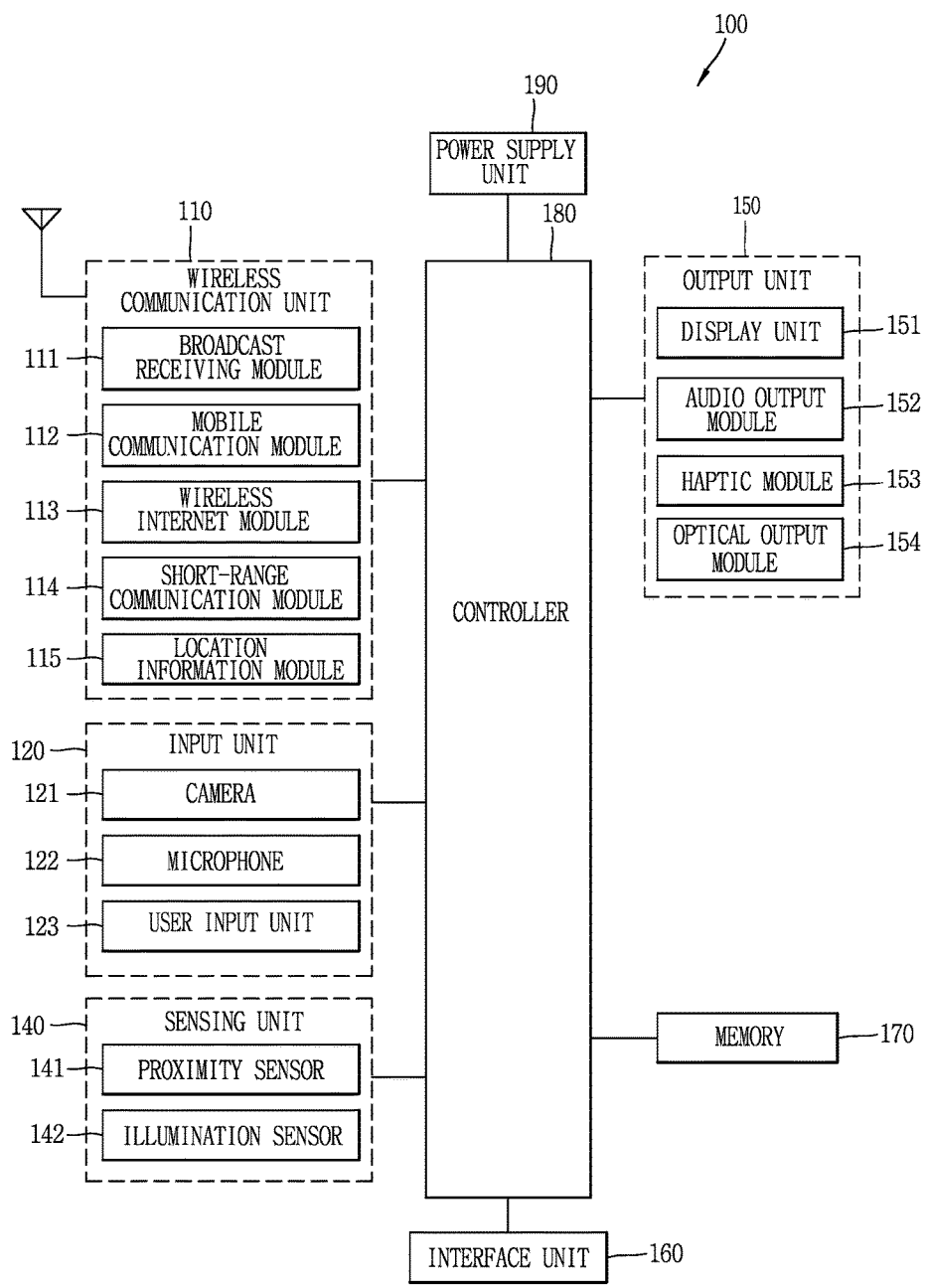
FIG. 1A is a block diagram of a mobile terminal according to an embodiment of the present disclosure.
Figure 1B:
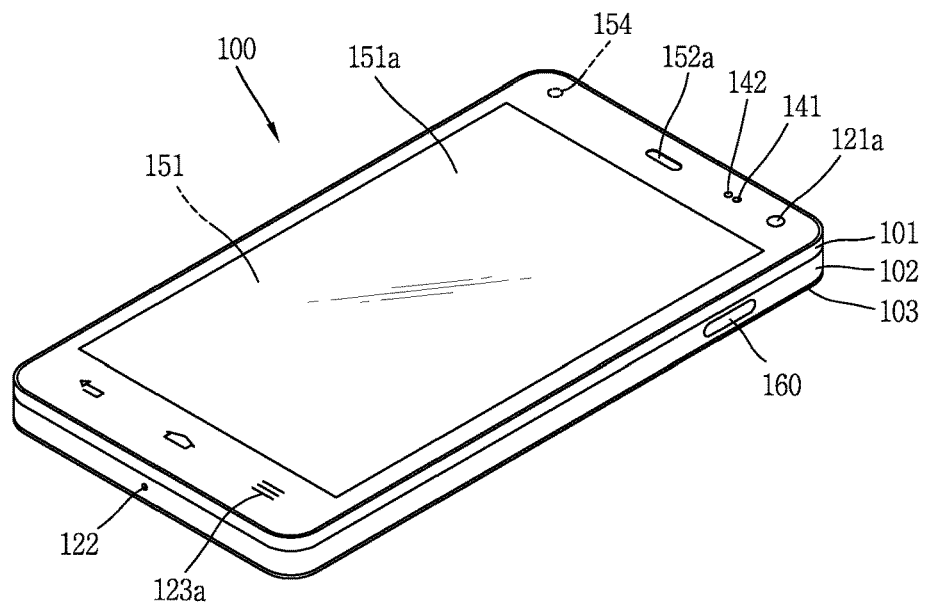
FIGS. 1B and 1C are conceptual views of one example of the mobile terminal, viewed from different directions.
Figure 1C:
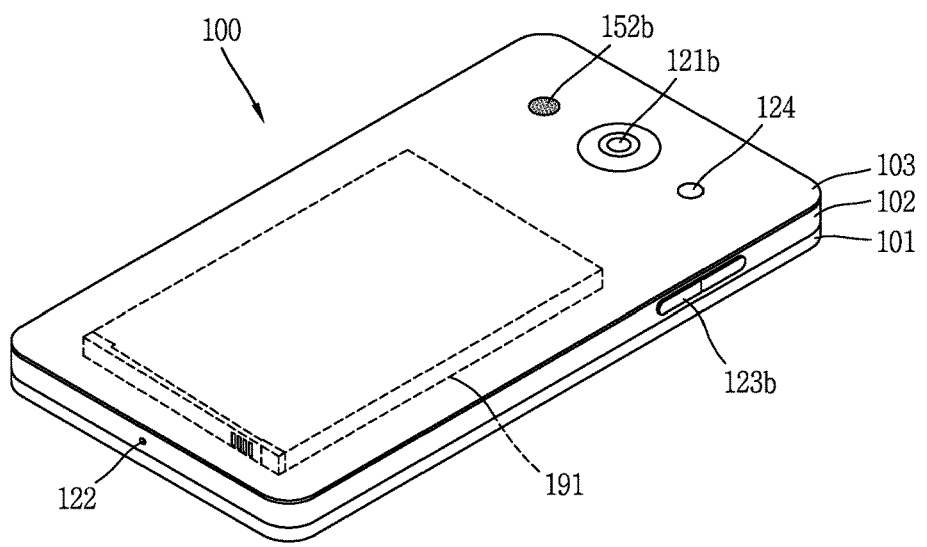

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions. The mobile terminal 100 may be shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access. The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor allows detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data can be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 typically controls operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152*a*, the proximity sensor 141, the illumination sensor 142, the optical output module 154, the first camera 121*a*, and the first manipulation unit 123*a*, the side surface of the terminal body is shown having the second manipulation unit 123*b*, the microphone 122, and the interface unit 160, and the rear surface of the terminal body is shown having the second audio output module 152*b* and the second camera 121*b*.

However, those components may not be limited to the arrangement. Some components may be omitted or rearranged or located on different surfaces. For example, the first manipulation unit 123*a* may be located on another surface of the terminal body, and the second audio output module 152*b* may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver for transferring call sounds to a user's ear and the second audio output module 152*b* may be implemented in the form of a loud speaker to output alarm sounds, multimedia audio reproduction, and the like. The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a push (or mechanical) key, a touch key, and combinations thereof. Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities. A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
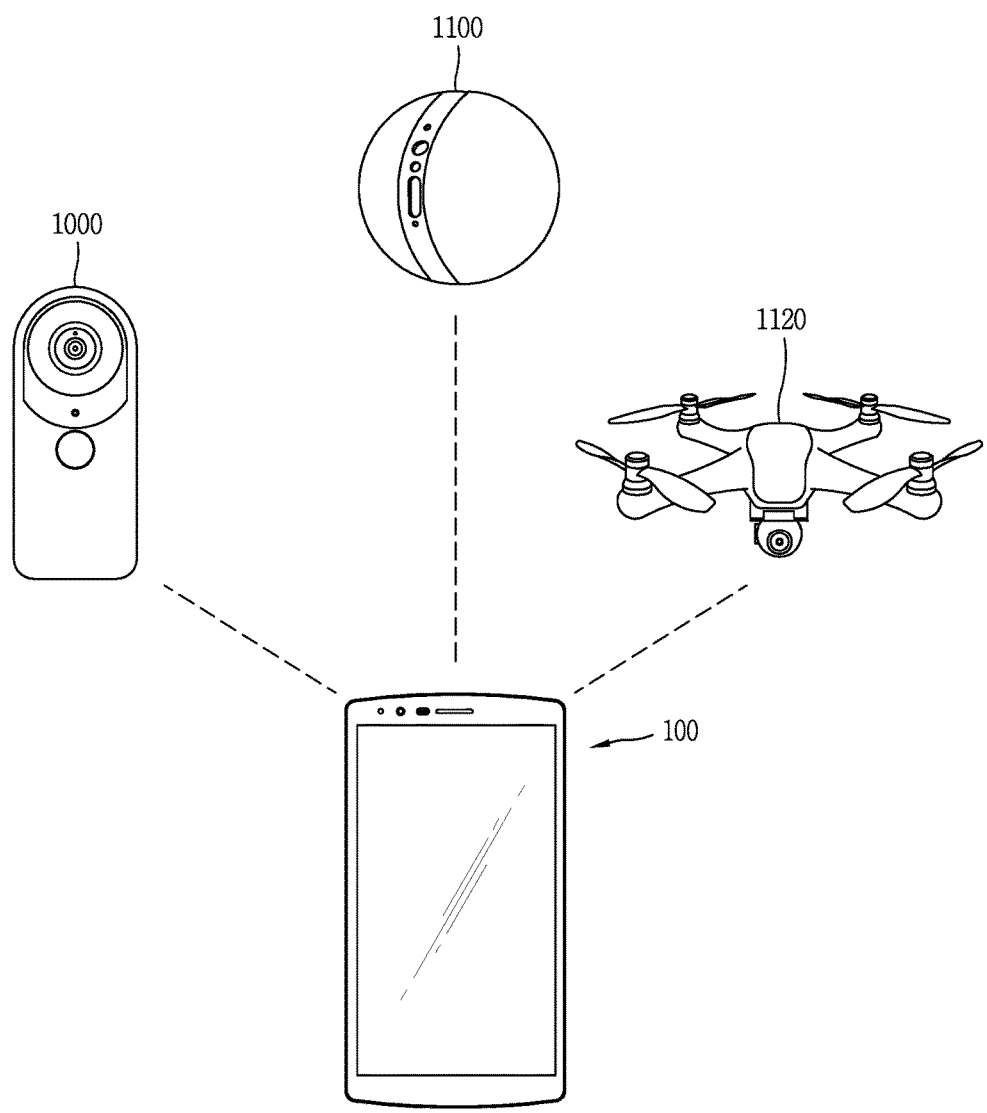
FIG. 2 is a conceptual view illustrating communication-connected (linked, established) states between a mobile terminal and various external devices according to an embodiment of the present invention.

Hereinafter, description will be given in detail of a method of expanding a camera function of a mobile terminal in a mobile terminal having at least one of the aforementioned components, with reference to the accompanying drawings. FIG. 2 is a conceptual view illustrating communication-connected (linked) states between a mobile terminal and various external devices.

In recent time, the mobile terminal uses functions of various external devices for assisting or extending its functions by performing communication with such various external devices which can perform communications with the mobile terminal. For assisting or extending the functions, the mobile terminal can perform communications with external devices through short-range communications. The short-range communication method will be understood in the description of FIG. 1A.

The external devices which can perform communications with the mobile terminal are external devices that can exchange data with the mobile terminal through communications, namely, external devices each having a short-range communication module for the short-range communication.

For example, as illustrated in FIG. 2, external devices which can perform communications with the mobile terminal 100 may be a 360° camera 1000 that can capture images at 360°, a rolling bot 1100 that can perform a rotary motion and captures images during the rotary motion, a drone 1120 that can fly and captures images during the flight, and the like. As another example, wearable devices, namely, a smart watch, a smart glass, a head mounted display (HMD), and the like may also be included in the external devices.

The mobile terminal may transmit at least part of data processed therein to external devices. In this instance, a user can use the at least part of the data processed in the mobile terminal through the external devices. Meanwhile, the mobile terminal disclosed herein may control the external devices while performing communications with the communication-allowed external devices, specifically, external devices each with a camera.

In addition, the controller 180 disclosed therein may control a plurality of cameras provided in the mobile terminal itself, other than the cameras provided in the external devices. In this instance, switching among the plurality of cameras of the mobile terminal will be understood based on the communication connecting method and the communication releasing method of the external devices, and thus detailed description thereof will be omitted.

Also, in the following description, a preview image displaying method and an image capturing method through cameras of external devices and cameras of the mobile terminal may also equally be applied using the plurality of cameras of the mobile terminal. However, a relationship between the cameras of the mobile terminal and the cameras of the external devices will merely be described hereinafter, for the sake of explanation.

Hereinafter, description will be given of a method of extending camera functions of a mobile terminal using various external devices each with a camera, while the mobile terminal performs communications with the various external devices. In particular, FIG. 3A is a flowchart illustrating a method of controlling a mobile terminal and an external device according to an embodiment of the present invention, FIG. 3B is a flowchart illustrating a communication connecting method between a mobile terminal and an external device according to an embodiment of the present invention, and FIGS. 4A to 6B are conceptual views illustrating a communication connecting method and a communication releasing method between an external device and a mobile terminal.

Figure 3A:
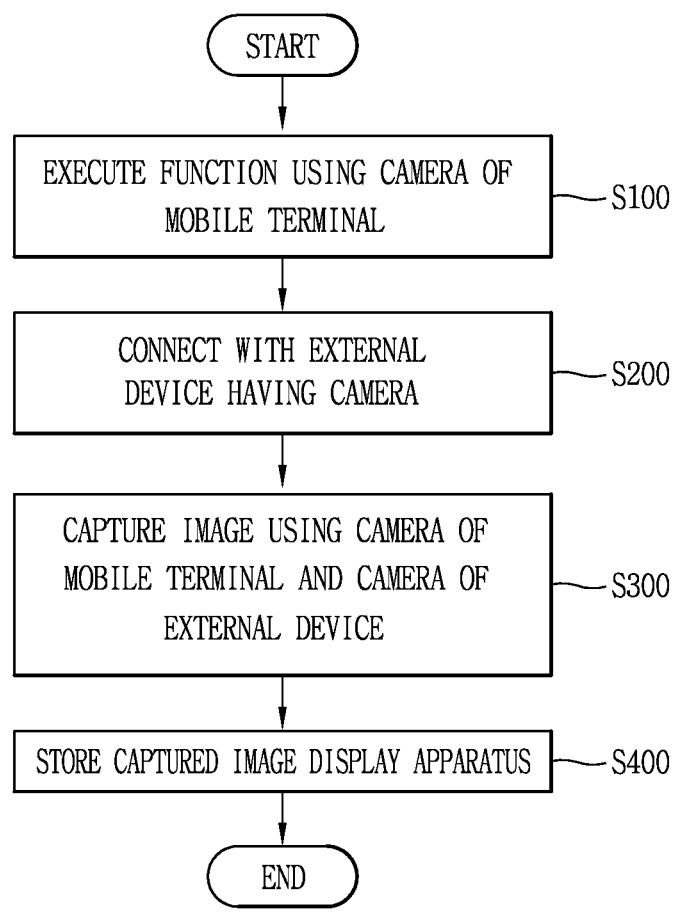
FIG. 3A is a flowchart illustrating a method of controlling a mobile terminal and an external device according to an embodiment of the present invention.
Figure 3B:
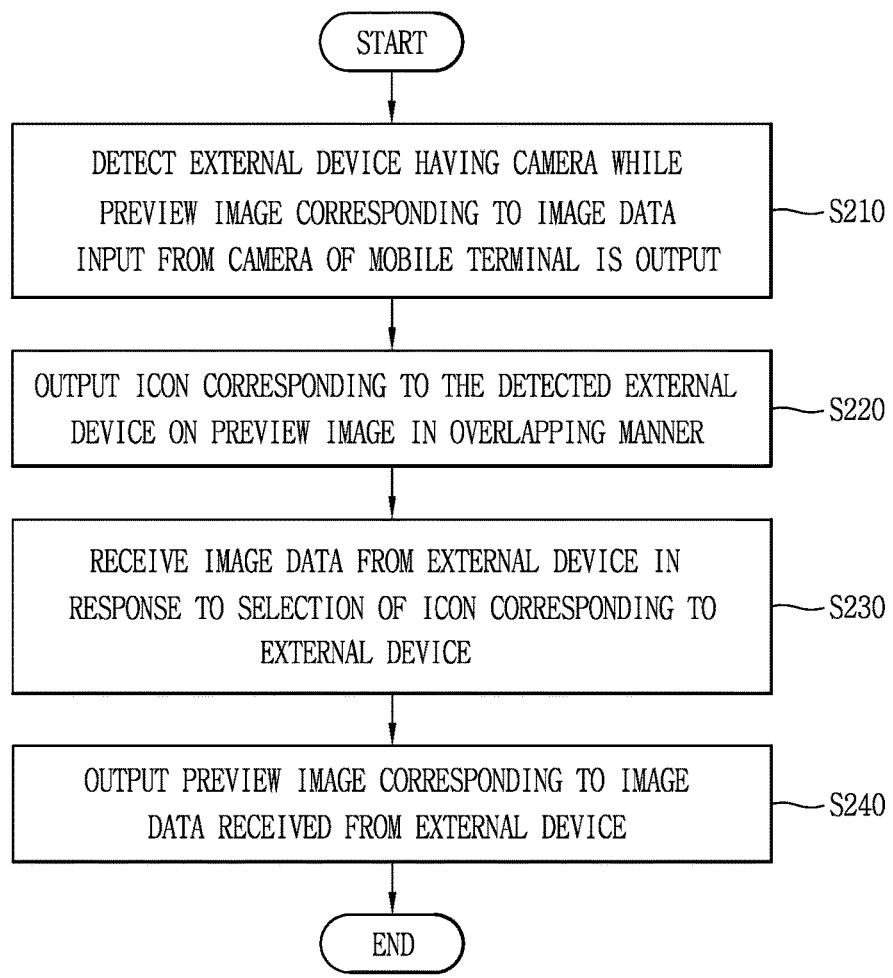
FIG. 3B is a flowchart illustrating a communication connecting method between a mobile terminal and an external device according to an embodiment of the present invention.

First, as illustrated in FIG. 3A, the controller 180 of the mobile terminal disclosed herein can execute a function using a camera provided in the mobile terminal (S100). The mobile terminal disclosed herein may include a camera 121 for inputting image data of a subject to be captured. An additional description of the camera 121 will be understood by the description of FIG. 1A.

The controller 180 can execute an image capturing function for using the camera 121. The image capturing function refers to various functions associated with image capturing, such as a function of capturing image data input from the camera 121 into various formats of images (e.g., a still image, a video, a cinema graph image, a moving image, etc.), a function of setting a capture setting value, a preview function, a camera switching function and the like.

The image capturing function may be executed by a camera application installed on the mobile terminal. For example, the controller 180 can execute the image capturing function, in response to a touch input applied to an icon of the camera application.

The controller 180 can switch the camera 121 into an active state to receive image data from the camera 121 when the image capturing function is executed. Here, the active state refers to a state capable of receiving image data corresponding to a subject through an imaging sensor of the camera 121. On the contrary, an inactive state refers to a state in which the image data corresponding to the subject cannot be received.

Figure 4A:
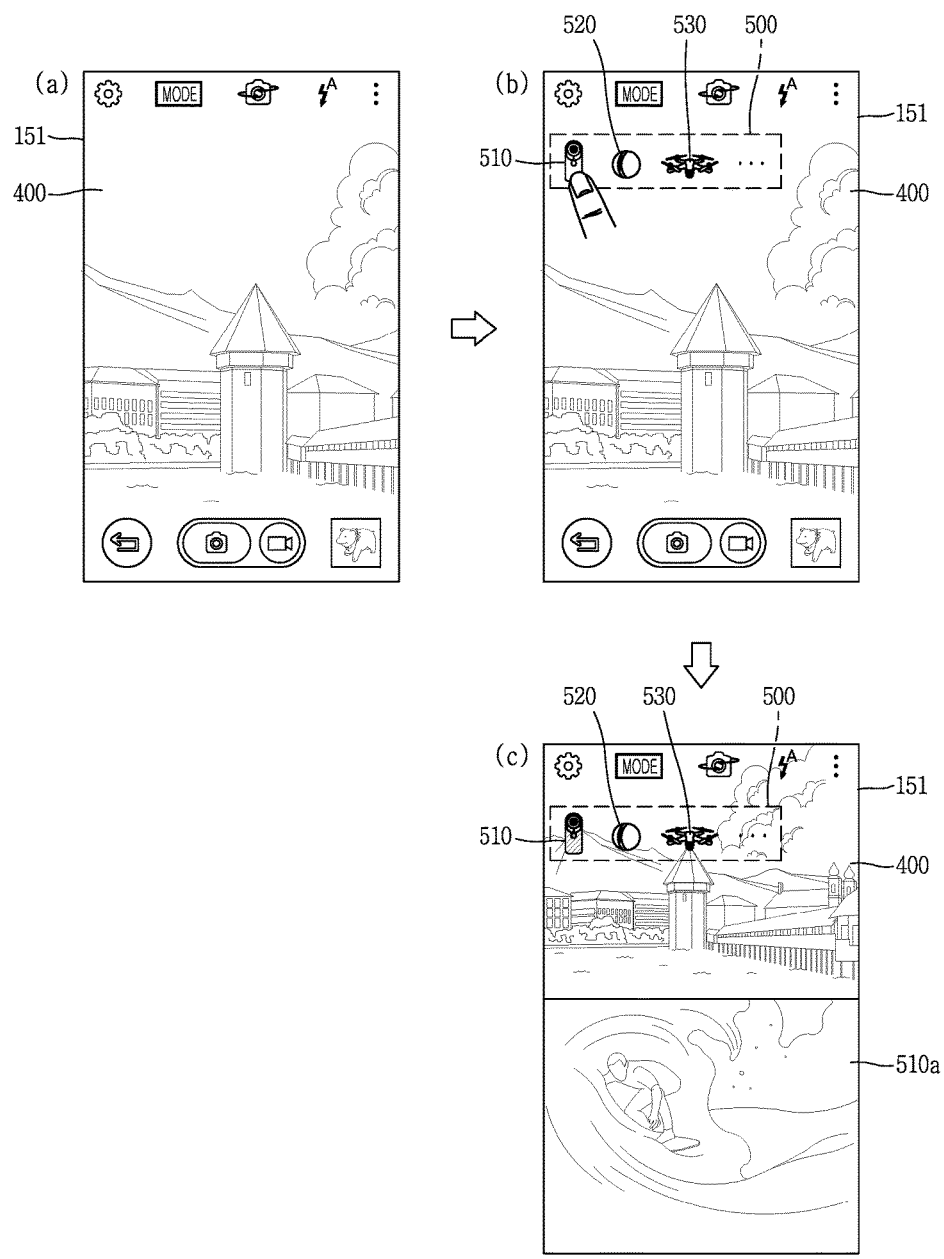
FIGS. 4A to 4C are conceptual views illustrating a communication connecting method between an external device and a mobile terminal.

The controller 180 can control the display unit 151 to output a preview image corresponding to the image data when the image data of the subject is received from the camera 121 which is in the active state. For example, as illustrated in FIG. 4A, the controller 180 can control the display unit 151 to output a preview image 400 corresponding to the image data received from the camera 121.

Here, the preview image refers to screen information previously showing an image to be captured prior to capturing the image using the camera. In other words, the preview image refer to screen information which is converted from the image data input from the camera in real time and output on the display unit 151. Also, the controller 180 can output function icons of the image capturing function that the camera application provides, along with the preview image. Examples of the function icons output together with the preview image may include a capture mode setting icon, a capture setting value setting icon, a preview icon, a camera switching icon and the like.

After the execution of the image capturing function, the controller 180 can perform a communication connection with an external device having a camera (S200). The controller 180 can detect the external device through the wireless communication unit 110 after the execution of the image capturing function.

In more detail, the controller 180 can broadcast a detection signal for detecting the external device. In this process, the external device receiving the detection signal may transmit a response signal (e.g., Ack signal) to the mobile terminal. Accordingly, the controller 180 of the mobile terminal 100 can detect the existence or absence of the external device. The controller 180 can detect the external device in various manners, in addition to the aforementioned method.

The external device may be an external device capable of performing communication with the mobile terminal, an external device for which a communication authentication has been completed, an external device having a camera, and the like. Here, the communication authentication refers to an authentication procedure for connecting communication before the mobile terminal and the external device perform wireless communication. For example, the mobile terminal and the external device may perform a communication authentication procedure by sharing their identification information with each other and exchanging permission information for performing the communication before performing communication.

Also, the external device may exist within a preset position (area) based on the mobile terminal. For example, the external device may exist within a communication-available area of a short-range communication unit of the mobile terminal. Meanwhile, the controller 180 can decide whether or not to perform a communication connection for performing communication with the detected external device, based on a preset condition or a user request. Hereinafter, the communication connecting method with the external device will be described in more detail with reference to FIG. 3B.

When the communication connection with the external device is performed, the controller 180 can capture an image using the cameras provided in the mobile terminal and the external device (S300). When the communication connection with the external device is performed, the controller 180 can receive the image data input from the camera of the external device through the communication with the external device.

The controller 180 can capture an image by using at least one of the camera of the mobile terminal and the camera of the external device, in response to a capture command being input. The capture command is a command for capturing image data input from a camera. For example, the capture command may be various types of commands, such as a capture command for capturing a video, a capture command for capturing a still image, a capture command for capturing a moving image, and the like.

The capture command may be input through a user gesture, in a touching manner, by voice and the like. For example, the capture command may be input by applying a touch input to a graphic object for inputting the capture command when the graphic object is output on the display unit 151 together with a preview image.

The controller 180 can perform image capturing according to a capturing mode when the capture command is applied. The capturing mode refers to a function of capturing an image in a specific manner. For example, image data input from a camera is captured in the form of a video in a video capturing mode, while image data input from a camera is captured in the form of a still image in a still image capturing mode.

The capturing mode may be set in various manners. For example, the capturing mode may be set to a panorama capturing mode, a best shot capturing mode, a multiview capturing mode, a moving image capturing mode, a capturing mode using an external device cooperating with the mobile terminal, and the like, so as to provide various functions associated with a capturing method.

The capturing mode may be selected by a user. For example, the user can directly select a desired capturing mode prior to inputting the capture command. The image capturing method will be described later in more detail, with reference to FIGS. 13 to 16B.

When the image is captured, the controller 180 can store the captured image (S400). When an image is captured according to a capturing mode, the controller 180 can store the image in the memory 170. The image may be stored in various forms. For example, the image may be stored in various forms, such as a video, a still image, a merging image, a moving image, a cinema graph image, a still image stored together with a video, and the like.

The user can execute a photo display function for checking the stored images. The photo display function is a function of displaying the images stored in the memory on the display unit 151. The photo display function may be executed through a photo application (or a gallery application) installed on the mobile terminal. For example, the controller 180 can execute the photo display function when a touch input is applied to an icon of the photo application.

The foregoing description has been given of the schematic flowchart of capturing the image using the camera provided in the mobile terminal and the camera provided in the external device in the mobile terminal according to an embodiment of the present invention. Hereinafter, the method of performing the communication connection with the external devices, in the mobile terminal according to an embodiment of the present invention, will be described in more detail.

First, as illustrated in FIG. 3B, the controller 180 can detect the external device having the camera in the state that the preview image corresponding to the image data input from the camera 121 of the mobile terminal is output on the display unit 151 (S210). As illustrated in (a) of FIG. 4A, when the image capturing function is executed, the controller 180 can output the preview image 400 corresponding to the image data input from the camera 121 on the display unit 151.

In the output state of the preview image, the controller 180 can detect one or more external devices in response to a user request, according to a capturing mode, or in an automatic manner. Here, the capturing mode refers to a cooperating mode in which capturing is executed in cooperation with the external device. The cooperation refers to a state in which the mobile terminal is connected with the external device and exchanges data with the connected external device through communication.

For example, when an image capturing function is executed, the controller 180 can detect an external device in real time, irrespective of a capturing mode. As another example, when the capturing mode is set as a cooperating mode after the execution of the image capturing function, the controller 180 can detect an external device in real time. As another example, the controller 180 can detect an external device in real time in response to a user input being applied for detecting the external device after the execution of the image capturing function.

When the external device having the camera 121 is detected, the controller 180 can output an icon corresponding to the detected external device on the preview image in an overlapping manner (S220). As illustrated in (b) of FIG. 4A, when a first external device, a second external device and a third external device are detected, the controller 180 can output icons 510, 520 and 530 corresponding to the detected external devices, respectively, on the preview image based on a user input or a preset condition.

Here, the user input may include a gesture input, a touch input, a voice input, a hovering input and the like. For example, when a hovering touch is detected by a proximity sensor when the external devices have been detected, the controller 180 can output the icons corresponding to the detected external devices on the preview image in the overlapping manner.

The preset condition may be a condition that external device is detected, a condition that a specific event is generated on an external device, a condition associated with image data received from an external device, and the like. For example, the controller 180 can output an icon corresponding to an external device on the preview image in an overlapping manner, in response to the external device being detected while the preview image is output. As another example, the controller 180 can output an icon corresponding to a detected external device on the preview image in an overlapping manner when the external device which has input image data of a specific subject is detected.

The icons corresponding to the detected external devices can be output on one area 500 of the preview image. The one area 500 may be a preset area or be changed by a user, and may not be output when any external device is not detected. When the icon corresponding to the detected external device is in plurality, output positions of the icons corresponding to the detected external devices may be decided according to relative distances between the mobile terminal and the external devices, and communication-connected orders with the mobile terminal.

For example, an icon corresponding to a first external device and an icon corresponding to a second external device can be output in a sequential manner when the first external device is located at a first distance from the mobile terminal and the second external device is located at a second distance, which is longer than the first distance, from the mobile terminal.

Meanwhile, the controller 180 can control the icons corresponding to the detected external devices to disappear from the preview image, based on a user request or a preset condition. Here, the preset condition may be condition that an input associated with an icon is not applied for a preset time. The controller 180 can receive image data from the external device when the icon corresponding to the external device selected (S230).

The controller 180 can execute a communication connection and a communication release with the external device using the icon corresponding to the external device overlaid on the preview image. In more detail, the controller 180 can execute the communication connection with the external device, in response to a touch input being applied to the icon corresponding to the external device when the external device with which communication has not been connected.

Here, the communication connection refers to an operation of setting the mobile terminal and an external device to a state in which they can exchange data with each other through wireless communication. Such communication-connected state between the mobile terminal and the external device may also be referred to as a cooperative state. On the contrary, a communication release refers to an operation of setting the mobile terminal and an external device to a state in which they cannot exchange data with each other through wireless communication.

Explaining the communication connection with reference to (b) of FIG. 4A, the controller 180 can perform a communication connection with a first external device, in response to a touch input applied to a first icon 510, among the first icon 510 corresponding to the first external device, a second icon 520 corresponding to the second external device and a third icon 530 corresponding to the third external device. Accordingly, the user can perform the communication connection with the external device immediately on the preview image, without a complicated process.

Meanwhile, after performing the communication connection with the first external device, the controller 180 can receive image data from a camera of the first external device in real time. This allows the mobile terminal disclosed herein to receive image data, which cannot be input through its camera, from the camera of the external device. Therefore, the user can capture images at various angles.

That is, the mobile terminal according to an embodiment of the present invention can extend the camera function thereof by receiving the image data in real time through the camera of the external device. Afterwards, the controller 180 can control the display unit 151 to output a preview image corresponding to the image data received from the external device (S240).

When the image data is received from the communication-connected external device, the controller 180 can control the display unit 151 to output the preview image corresponding to the image data received from the external device, based on a user request or a preset condition. The preset condition may be a condition that image data including a specific subject is received, and a condition associated with at least one of time, position and voice.

For example, as illustrated in (c) of FIG. 4A, when a specific subject is included in the image data received from a first external device in a communication-connected state with the first external device, the controller 180 can divide the display unit 151 into two areas, and simultaneously output the preview image 400 input from the camera 121 of the mobile terminal and a preview image 510a corresponding to the image data received from the first external device on the divided areas, respectively.

Meanwhile, as aforementioned, the controller 180 can perform the communication connection with an external device as soon as a selection of an icon corresponding to the external device, but alternatively provide a preview screen before performing the communication connection with the external device. For example, as illustrated in (a) and (b) of FIG. 4B, when a touch input is applied to a first icon 510 corresponding to a first external device, the controller 180 can output a thumbnail image 510b of a preview image corresponding to the image data received from the first external device.

In this process, the controller 180 can temporarily perform the communication connection with the first external device, in order to receive the image data from the first external device for a predetermined time. This is a temporary connection and thus may be released after a lapse of a preset time.

Figure 4B:
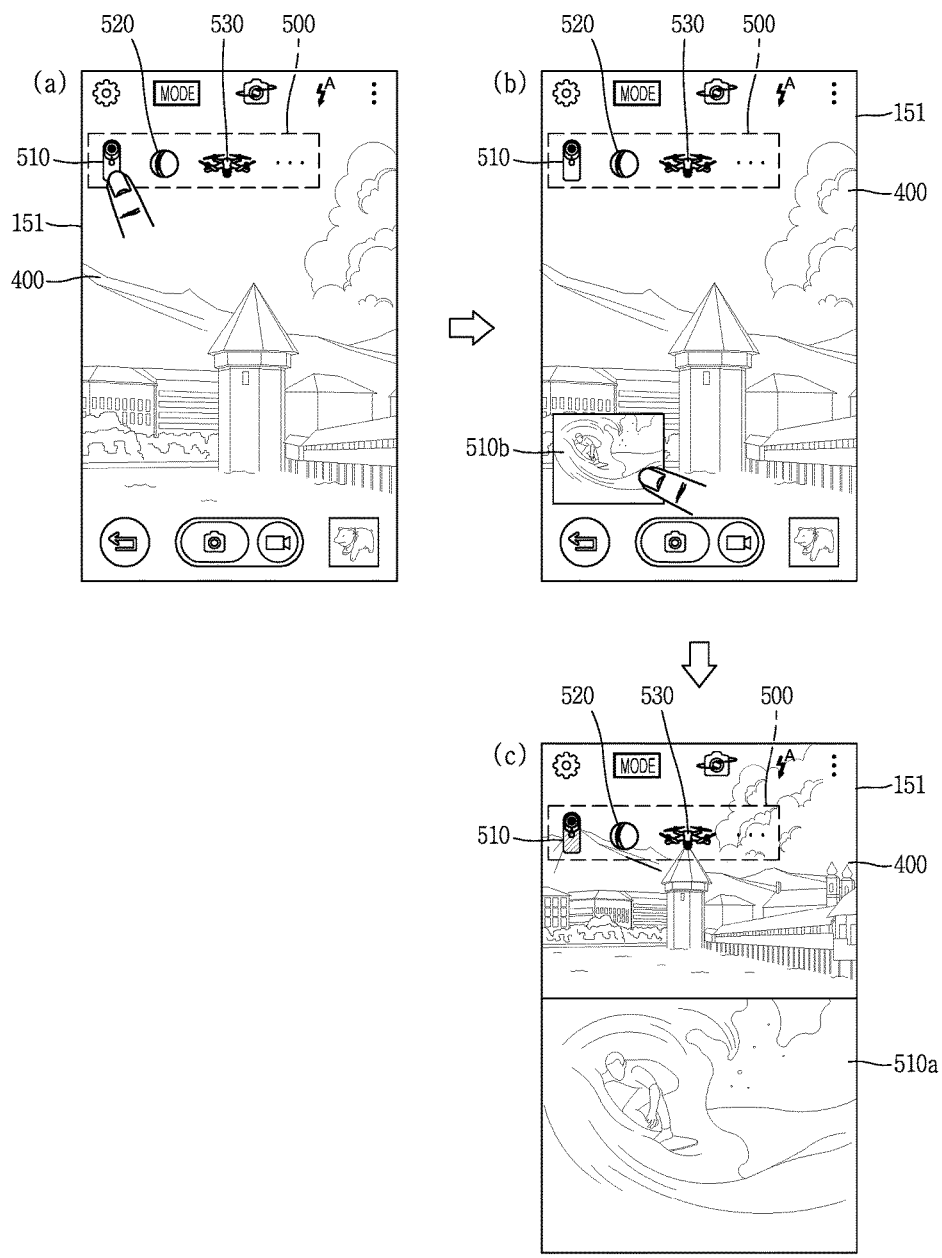

As illustrated in (c) of FIG. 4B, when a preset touch input is applied to the thumbnail image 510b, the controller 180 can perform the communication connection with the first external device. Here, the preset touch input may be a short touch input, a drag touch input, a long touch input and the like. This allows the user to decide whether or not to perform the communication connection, based on the thumbnail image of the preview image, before the communication is connected with the external device.

As another example, the controller 180 can semi-transparently output the preview image 510a corresponding to the image data received from the first external device, instead of the thumbnail image, on the preview image 400 input from the camera of the mobile terminal in an overlapping manner. As aforementioned, the controller 180 can receive image data by being temporarily connected with the first external device.

In addition, the controller 180 can perform the communication connection with the first external device when a touch input is applied to the first icon 510 corresponding to the first external device on the preview image 510a. Meanwhile, the area for outputting the icons corresponding to the external devices may be limited in size, which may cause a case where the icons corresponding to the detected external devices cannot all be output.

Figure 4C:
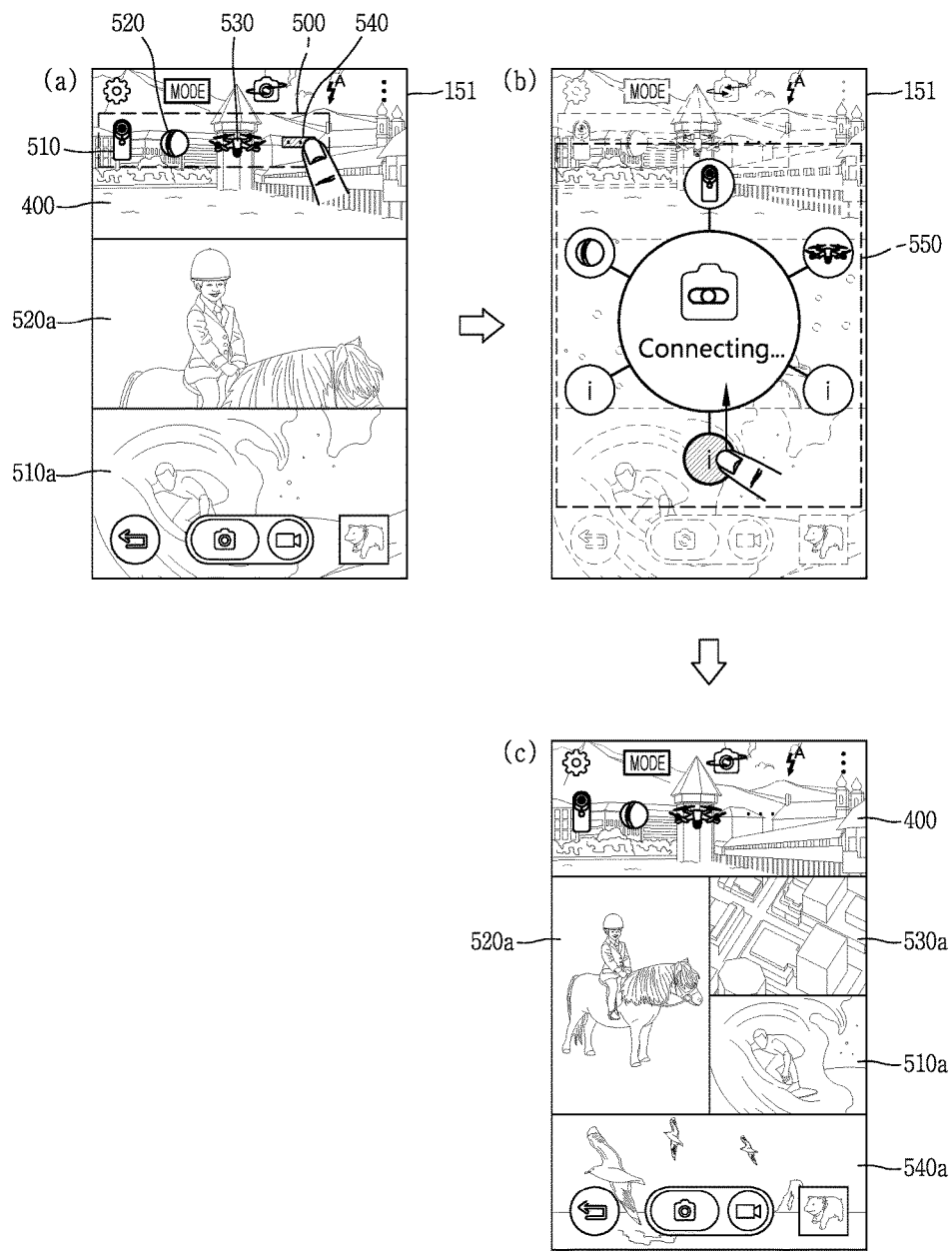

As illustrated in (a) of FIG. 4C, an icon 540 linked with a more-view function can be output on the output area 500 of the icons corresponding to the external devices. The more-view function is a function of outputting icons corresponding to currently-non-output external devices of the external devices detected by the controller 180.

As illustrated in (b) of FIG. 4C, the controller 180 can output icons 550 corresponding to all of the detected external devices, in response to a touch input applied to the icon 540 linked with the more-view function. Accordingly, the user can conveniently select all of the external devices detected by the controller 180.

As illustrated in (b) of FIG. 4C, when a specific icon is selected, the controller 180 can perform a communication connection with an external device corresponding to the selected specific icon. Afterwards, as illustrated in (c) of FIG. 4C, the controller 180 can output preview images 510a, 520a, 530a and 540a corresponding to image data received from a plurality of external devices on the display unit 151, along with the preview image 400 corresponding to the image data input from the camera of the mobile terminal.

Meanwhile, as illustrated in (a) of FIG. 5, the controller 180 can newly detect a third external device in a state that icons 510 and 520 corresponding to a first external device and a second external device are output. As illustrated in (b) of FIG. 5, the controller 180 can further output an icon 530 corresponding to the newly-detected third external device on the output area 500 of the icons corresponding to the external devices.

Or, as illustrated in (c) of FIG. 5, the controller 180 can further output a thumbnail image 530a of a preview image, which corresponds to image data received from the newly-detected third external device, together with the icon 530 corresponding to the third external device. In this instance, the controller 180 can allow the mobile terminal to be temporarily connected with the third external device for performing communication. As illustrated in (d) of FIG. 5, the thumbnail image 530a can automatically disappear when a preset time elapses. Accordingly, the user can check the preview image of the image data received from the newly-detected external device, even without the communication connection with the third external device.

The foregoing description has been given of the communication connecting method between the external devices and the mobile terminal. Hereinafter, a method of releasing a communication connection between an external device and the mobile terminal will be described. In particular, the controller 180 can release a communication connection with an external device based on a user request. In this instance, the controller 180 does not receive image data any more from the external device.

The user request may be received in various manners. For example, as illustrated in (a) of FIG. 6A, in a communication-connected state with a first external device, the controller 180 can control a first icon 510 corresponding to the first external device to be displayed with a different color, so as to be visually distinguished from icons 520 and 530 corresponding to the other external devices without being communication-connected with the mobile terminal, and output on the display unit 151 a preview image 510a corresponding to image data received from the first external device.

Figure 6A:
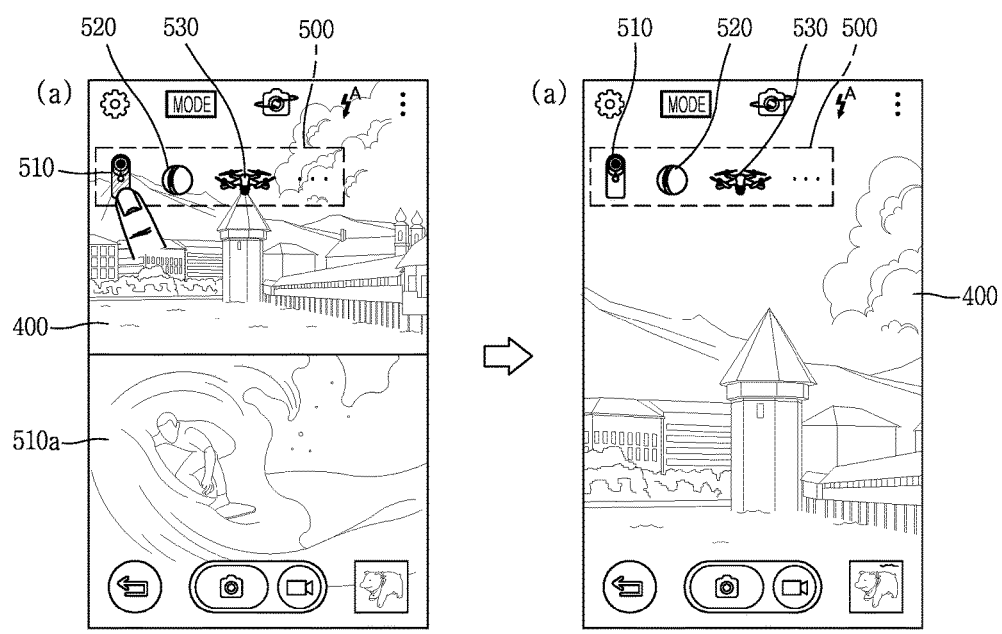
FIGS. 6A and 6B are conceptual views illustrating a case of releasing a connected communication with an external device.

In this state, as illustrated in (a) of FIG. 6A, when a touch input is applied to the first icon 510 corresponding to the first external device, the controller 180 can release the communication connection (or communication link) with the first external device. In this instance, the controller 180 does not receive image data any more from the first external device. Also, as illustrated in (b) of FIG. 6A, the controller 180 does not output the preview image 510a any more on the display unit 151.

Figure 6B:
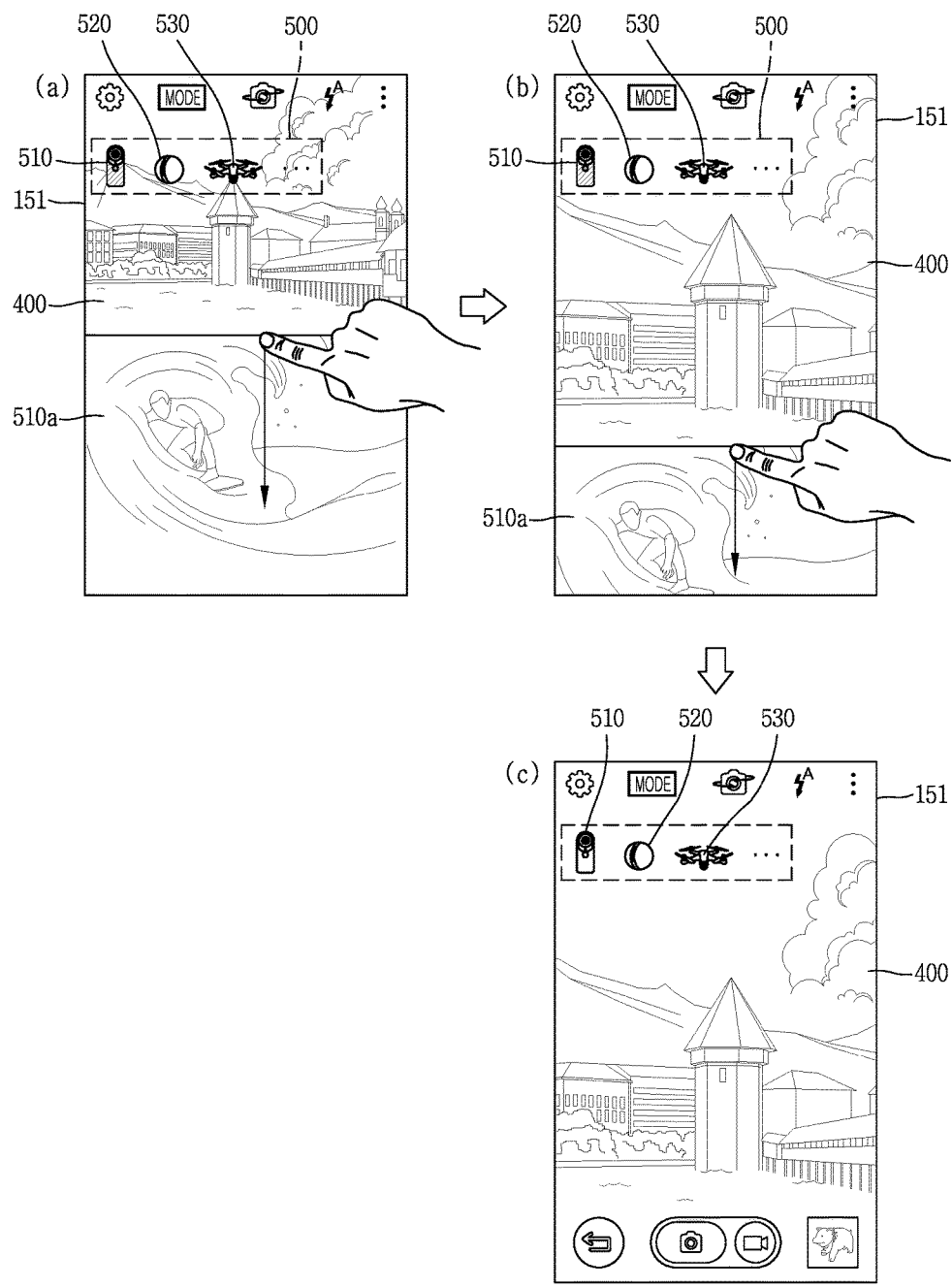

As another example, referring to (a) of FIG. 6B, in a communication-connected state with the first external device, the controller 180 can output on the display unit 151 the preview image 400 corresponding to the image data input from the camera of the mobile terminal, and the preview image 510a corresponding to the image data received from the first external device. In this instance, the controller 180 can adjust a size of each preview image 400, 510a based on a drag touch applied. For example, as illustrated in (a) of FIG. 6B, the user can apply a drag input to a boundary area between the preview images 400 and 510a.

As illustrated in (b) of FIG. 6B, according to an applied direction of the drag input, the controller 180 can increase a size of an output area of the preview image 400 corresponding to the image data input from the camera of the mobile terminal, and decrease a size of an output area of the preview image 510a corresponding to the image data received from the first external device by the increased size of the output area of the preview image 400.

Meanwhile, the controller 180 can control the release of the communication connection, by controlling an output size of each preview image. In more detail, when an output size of the preview image 510a corresponding to the image data received from the first external device is reduced to be smaller than a preset size in response to another drag input applied continuous to the drag input, the controller 180 can control the preview image 510a corresponding to the image data received from the first external device to disappear from the display unit 151.

In addition to this, the controller 180 can also release the communication connection between the first external device and the mobile terminal. That is, the user can control the size of the output area of the preview image and also control the release of the communication connection. In addition, the controller 180 can release a communication connection with an external device when a battery of the external device is powered off.

So far, the foregoing description has been given of a method of performing a communication connection and a release of the communication connection between a mobile terminal and an external device with a camera while executing a camera function of the mobile terminal. With the configuration, the present invention can more intuitively perform the communication connection with the external terminal on a preview image, even without entering a separate setting screen for setting the communication connection. Therefore, the present invention can provide more extended camera functions, without being limited to the simple camera function of the mobile terminal.

Figure 7A:
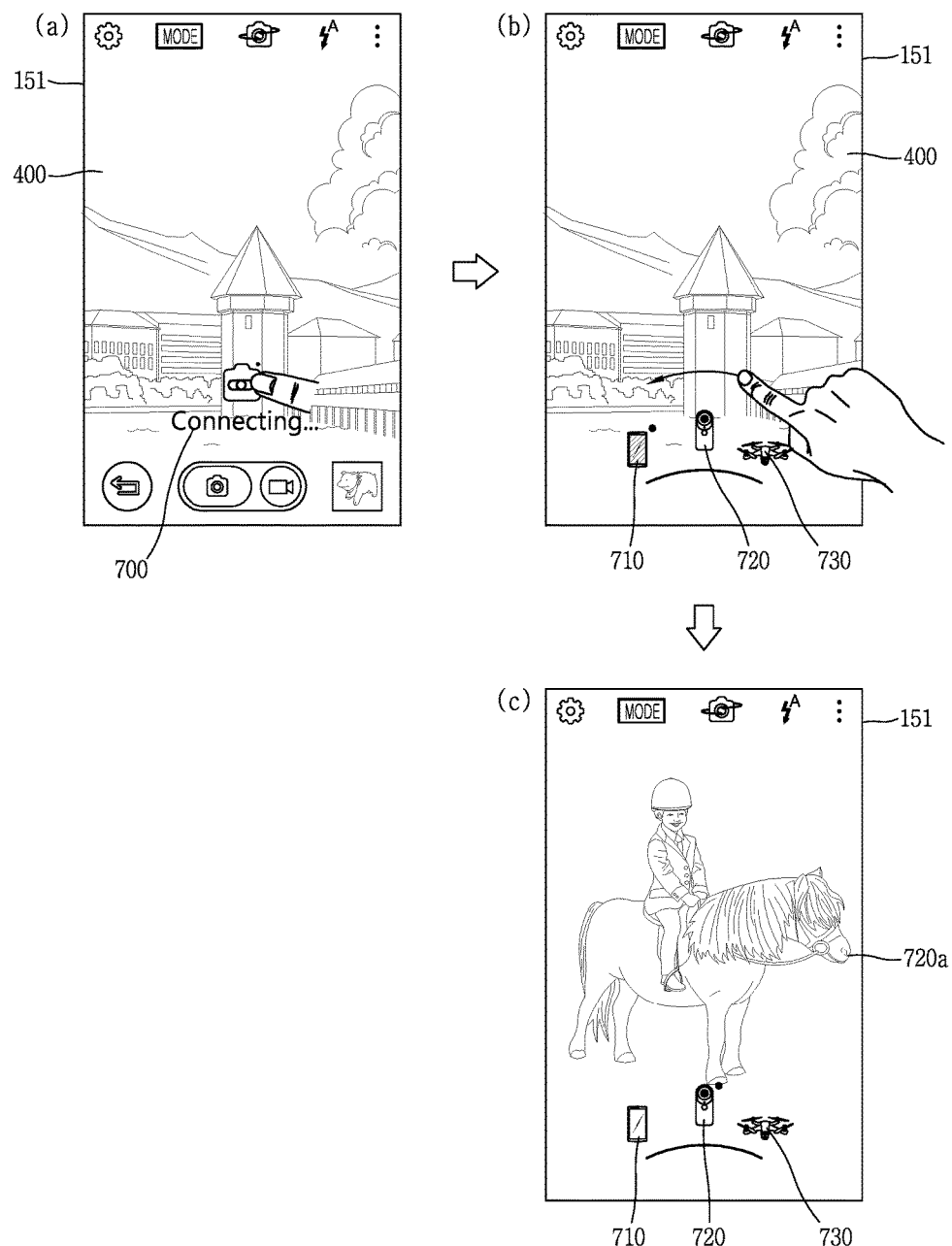
FIGS. 7A and 7B are conceptual views illustrating a method of outputting preview images of communication-connected external devices in a first mode.
Figure 7B:
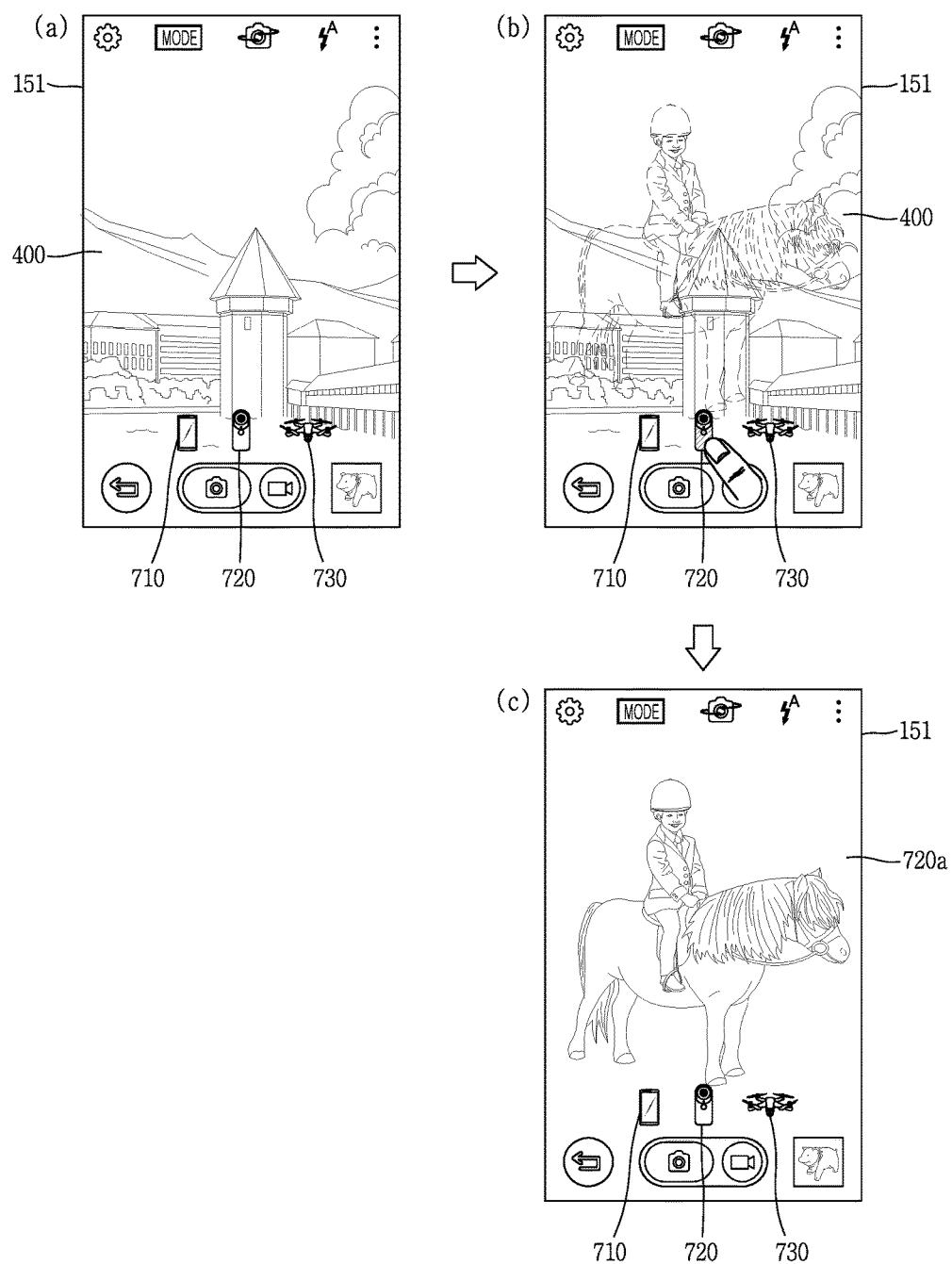

Hereinafter, a method of providing preview images of communication-linked external devices will be described. FIGS. 7A and 7B are conceptual views illustrating a method of outputting preview images of communication-connected external devices in a first mode, and FIGS. 8A to 8E are conceptual views illustrating a method of outputting preview images of communication-connected external devices in a second mode.

When the communication connection is established between the mobile terminal and at least one external device, the controller 180 can receive image data from the at least one external device, and output a preview image corresponding to the received image data on the display unit 151. In this instance, the controller 180 can output the preview image corresponding to the received image data from the at least one external device according to a display mode.

Here, the display mode is a mode for which a method of outputting a preview image is set. The display mode may include a first mode outputting only one preview image, and a second mode outputting a plurality of preview images. The first mode may also be referred to as another term such as a single-view mode, and the second mode referred to as another term such as a multiview mode. However, the present invention is not limited to those terms, but can use other terms having the same meaning. Hereinafter, the terms of the first mode and the second mode will be used for the sake of explanation.

The display mode can be selected by the user or set according to a number of communication-connected external devices. For example, the controller 180 can output a preview image in the first mode when there is no communication-connected external device, while outputting a preview image in the second mode when there is at least one communication-connected external device. As another example, the controller 180 can display images in one of the first mode and the second mode according to a user selection, irrespective of the number of communication-connected external devices.

Hereinafter, the display method in the first mode will be described in detail with reference to FIGS. 7A and 7B. First, it is assumed that the mobile terminal disclosed herein is in a communication-connected state with a first external device and a second external device. Here, when a first mode is set, the controller 180 can output on the display unit 151 only one preview image of a preview image corresponding to image data input from the camera 121 of the mobile terminal, a preview image corresponding to image data received from the first external device, and a preview image corresponding to image data received from the second external device.

For example, as illustrated in (a) of FIG. 7A, the controller 180 can output the preview image 400 corresponding to the image data input from the camera 121 in the first mode. In this instance, the controller 180 can perform switching between preview images output on the display unit 151. Here, the switching between the preview images refers to an operation of the mobile terminal for controlling the display unit to output one of outputtable preview images when another preview image is output.

In accordance with one embodiment of the present invention, the controller 180 can perform the switching between the preview images using a graphic object for switching the preview images. In more detail, as illustrated in (a) of FIG. 7A, in the first mode, the controller 180 can output on the preview image 400 a graphic object 700 which indicates a communication-connected state with the first external device and the second external device whose preview images are not currently output.

The graphic object 700 allows the user to recognize a currently receivable state of images from the external devices. In more detail, as illustrated in (b) of FIG. 7A, the controller 180 can output an icon 710 corresponding to the mobile terminal, and icons 720 and 730 corresponding the communication-connected external devices, for switching the preview image, in response to a touch input applied to the graphic object 700.

As illustrated in (b) of FIG. 7A, in the output state of the icons 710, 720 and 730, the controller 180 can apply a preset touch input for switching the preview image. For example, the preset touch input may be a swipe touch input. Here, the swipe touch input is an input of dragging an output screen of the display unit to left or right like turning over a page. For example, as illustrated in (b) of FIG. 7A, the swipe input may be a drag input applied from right to left of the display unit.

The controller 180 can decide a preview image to be output on the display unit according to the applied direction of the swipe touch input. For example, as illustrated in (c) of FIG. 7A, when the swipe touch input is applied in a first direction, the controller 180 can substitute a preview image 720a corresponding to the image data received from the first external device for the preview image 400 corresponding to the image data input from the camera 121. That is, in the present invention, because only one preview image is output in the first mode, the user can more intuitively perform the switching of the preview images through the swipe touch input.

According to another embodiment of the present invention, as illustrated in (a) and (b) of FIG. 7B, when the icon 720 corresponding to the first external device is selected for switching a preview image, the controller 180 can semi-transparently output the preview image 510a corresponding to the image data received from the first external device, by overlapping the previously-output preview image 400.

When desiring to connect communication with the first external device after checking the preview image 510a corresponding to the image data received from the first external device, the user can apply a touch input to the icon 720 corresponding to the first external device. In this instance, the controller 180 can output the preview image 720a corresponding to the image data received from the first external device on the display unit 151.

The foregoing description has been given of the switching method between the preview images in the first mode. Hereinafter, the second mode of outputting a plurality of preview images in a simultaneous manner will be described.

The following description will be given under assumption that the mobile terminal is in a communication-connected state with a plurality of external devices. First, the controller 180 can output on the display unit 151 a preview image corresponding to image data received from at least one of the plurality of communication-connected external devices in the second mode.

In this instance, the at least one external device whose preview image is output on the display unit 151 may be an external device meeting a preset condition, or an external device selected by the user. Here, the preset condition may be one of a condition that image data including a specific subject is transmitted, a condition that a preview image appropriate for a capturing mode is transmitted, and a condition associated with at least one of time, position and voice recognition.

For example, as illustrated in (a) of FIG. 8A, a preview image including a specific subject which is not included in a currently-output preview image 1200 may be received from an external device. As illustrated in (b) of FIG. 8A, the controller 180 can output a preview image 1210 received from the external device on the display unit 151. Or, as illustrated in (c) of FIG. 8A, the controller 180 can output both of the preview image 1210 received from the external device and the currently-output preview image 1200 in the second mode.

As another example, as illustrated in (b) of FIG. 8A, the controller 180 can set external devices, of which preview images are to be output in a multiview mode, according to a display mode. If the display mode is a figure mode of outputting a person-based subject, the controller 180 can output preview images 1200, 1210, 1220 and 1230 including the person-based subjects. Further, as illustrated in (c) of FIG. 8B, when the display mode is a background mode of outputting a background-based subject, the controller 180 can output only preview images 1300, 1310, 1320 and 1330 including the background-based subjects.

Figure 8C:
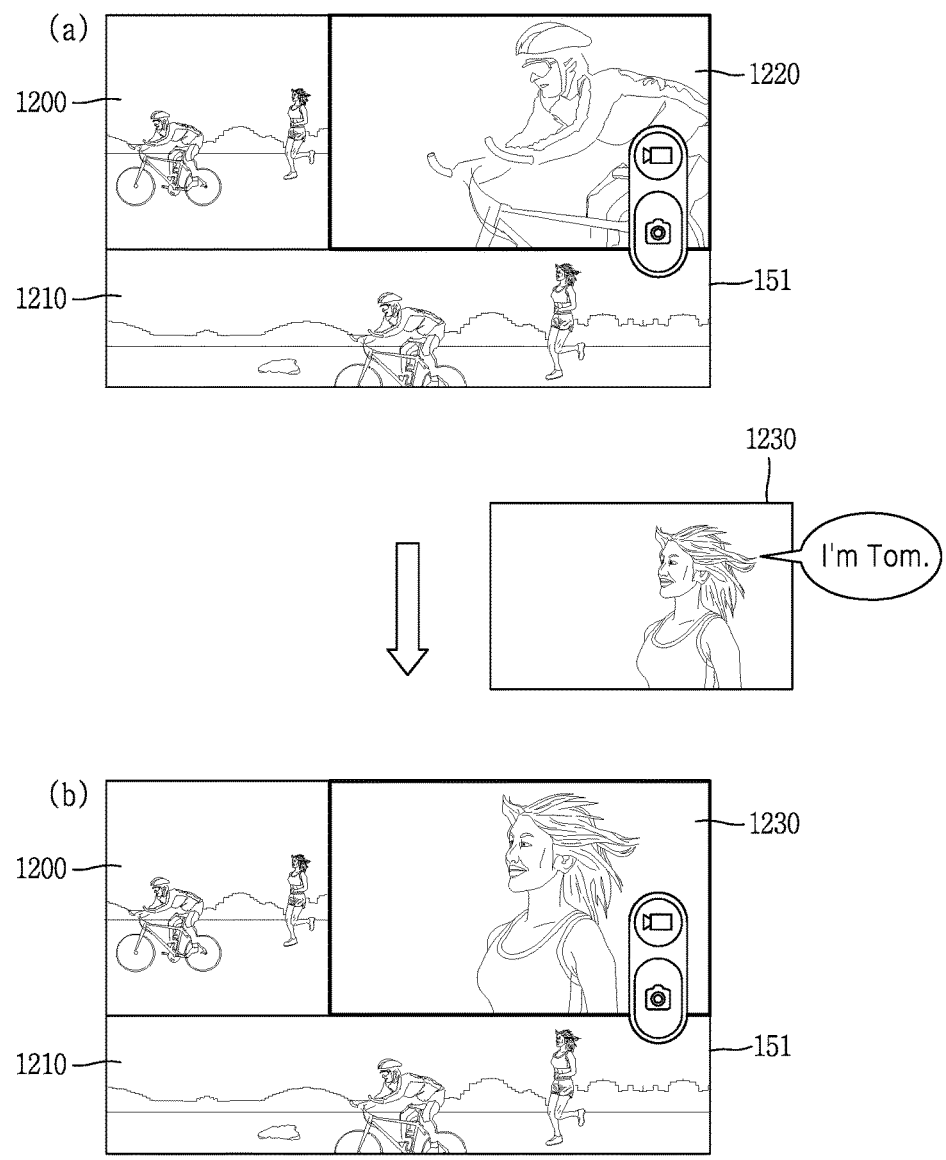

As another example, as illustrated in (a) and (b) of FIG. 8C, the controller 180 can output a preview image corresponding to image data received from an external device to which a voice input has been applied. That is, when the first external device receives a voice input, the controller 180 can output a first preview image 1230 on the display unit 151. In this instance, a previously-output preview image 1220 may disappear from the display unit 151.

That is, the present invention can provide only some preview images under a predetermined condition, without outputting every preview image corresponding to image data received from a plurality of external devices, when the plurality of external devices are in a communication-connected state with the mobile terminal. In addition, the preview images corresponding to the image data received from the plurality of external devices can all be displayed, and detailed description thereof will be understood by the embodiment of outputting those some preview images.

The controller 180, in the second mode, may divide an area of the display unit 151 as many as a number of preview images to be output on the display unit 151, and output the preview images on the divided areas, respectively. For example, as illustrated in (a) of FIG. 8D, the controller 180 can divide the display unit 151 into five areas when five preview images 400, 510a, 520a, 530a and 540a are to be output, and output the preview images 400, 510a, 520a, 530a and 540a on the five divided areas, respectively.

In this instance, the controller 180 can adjust a size of the output area of each preview image. For example, as illustrated in (a) and (b) of FIG. 8D, the controller 180 can increase the size of the output area of the first preview image 510a by an applied length of a drag input and decrease the size of the output area of the third preview image 530a by the increased size, in response to the drag input applied to a boundary area between the first preview image 510a and the third preview image 530a.

Figure 8D:
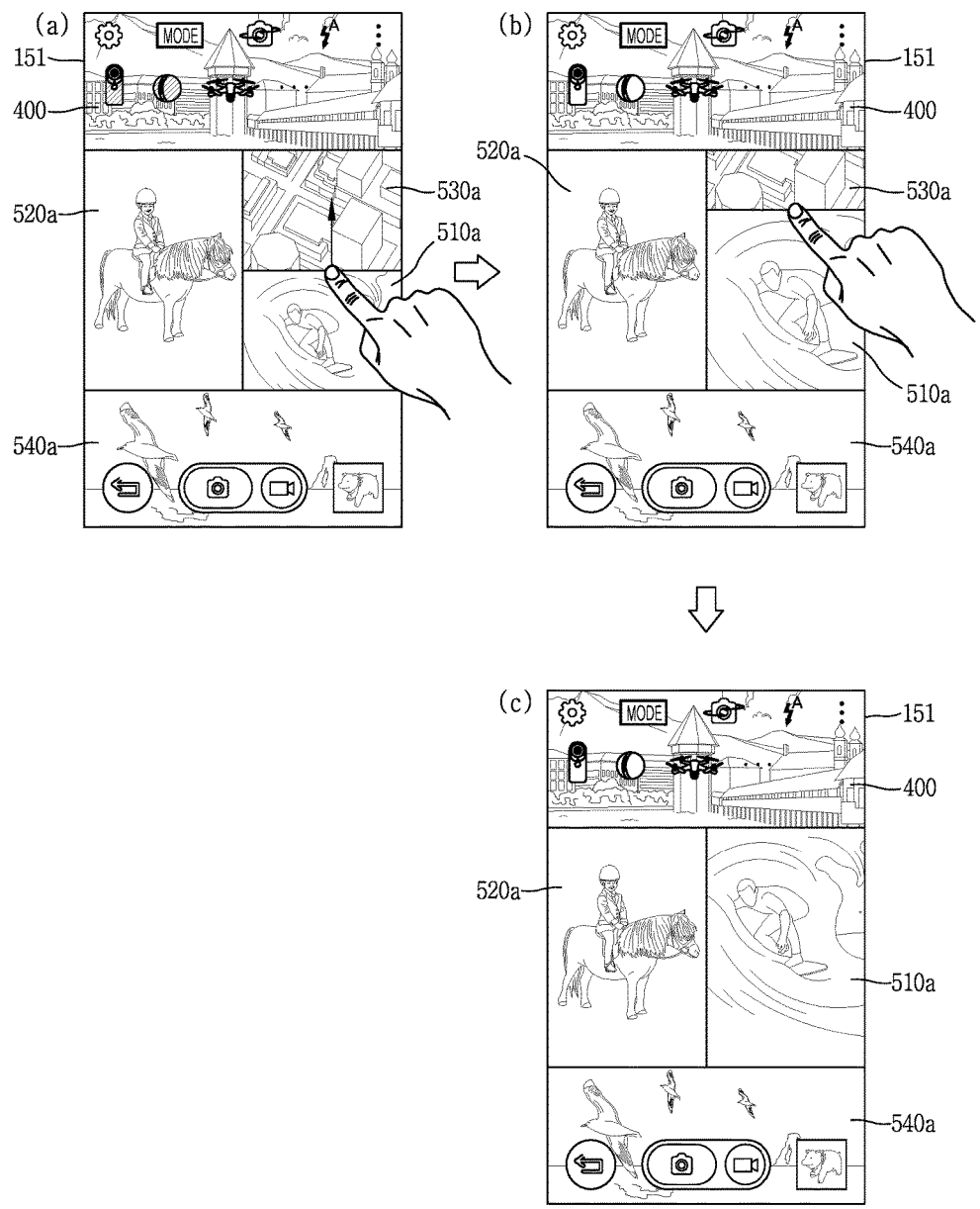
Figure 8E:
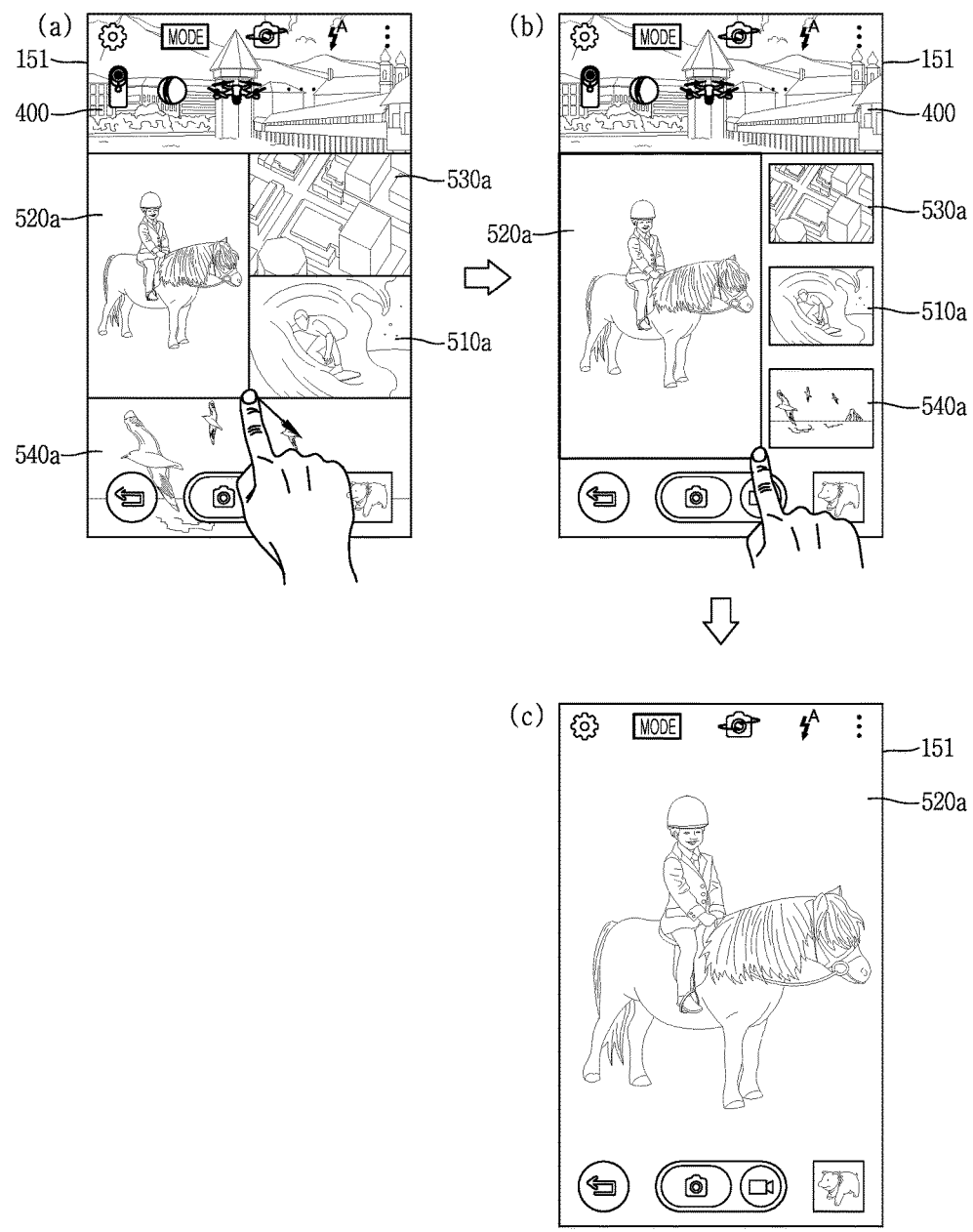

As illustrated in (c) of FIG. 8D, the controller 180 can control the third preview image 530a to disappear from the display unit 151 when the size of the output area of the third preview image 530a is decreased below a preset size. In addition to this, the controller 180 can release the connected communication with the third external device which has transmitted the third preview image 530a when the third preview image 530a disappears from the display unit 151.

Meanwhile, the controller 180 can switch the display mode by adjusting an output size of a preview image when the plurality of preview images 400, 510a, 520a, 530a and 540a are output. For example, as illustrated in (a) of FIG. 8E, the controller 180 can increase a size of the output area of the second preview image 520a of the plurality of preview images 400, 510a, 520a, 530a and 540a. As illustrated in (b) of FIG. 8E, when the size of the output area of the second preview image 520a is increased by more than a preset size, the controller 180 can switch the second mode into the first mode. As illustrated in (c) of FIG. 8E, the controller 180 can control the display unit 151 to output only the second preview image 520a.

The foregoing description has been given of methods of adjusting output size of preview images, releasing a communication connection and switching a display mode. The user can simultaneously check image data input through cameras of a plurality of external devices in a second mode.

Hereinafter, description will be given of a method of providing a recommended image using the rest of images without being output on the display unit 151, while a preview image corresponding to image data received from at least one external device of a plurality of external devices is output in the second mode. FIGS. 9A to 10C are conceptual views illustrating a method of providing a recommended image.

The following description will be given under assumption that the mobile terminal is in a communication-connected state with a plurality of external devices. Also, for the sake of explanation, the following description will be given of only a case of outputting a preview image in the second mode. However, the present invention may not be limited to this but be equally applied even in the first mode.

The controller 180 of the mobile terminal disclosed herein may provide an image corresponding to image data received from an external device which meets a preset condition, as a recommended image, when a plurality of external devices, for example, a first external device, a second external device, a third external device and a fourth external device, are in a communication-connected state with the mobile terminal. Here, the recommended image refers to an image corresponding to image data received from an external device meeting a preset condition. Also, the recommended image refers to images which are detected to recommend capturing of the images to the user.

The preset condition may be a condition associated with a specific event. In more detail, the present condition may be one of a condition that image data including a specific subject is received, a condition associated with situation information, condition associated with an attribute of a subject, and a condition that an external device is a voice-recognized external device. Here, the situation condition refers to general information related to environments surrounding the mobile terminal, such as a location, a moving speed, a moving time and the like of the mobile terminal. Also, the attribute of the subject may be information related to a subject, such as a motion, a color, brightness and the like.

For example, the present condition may be a condition that an external device is an external device from which image data including a specific subject stored in the memory has been received. As another example, the preset condition may be a condition that an external device is an external device from which image data including a dynamic subject has been received, or a condition that an external device is an external device from which image data including a static subject has been received. As another example, the present condition may be a condition that an external device is an external device associated with a currently-located place of the mobile terminal. As another example, the present condition may be a condition that an external device is an external device which has received a voice input.

That is, the present invention can provide recommended images to help the user capture images appropriate for a current environment when the mobile terminal is in a communication-connected state with a plurality of external devices and is provided with some of preview images of the plurality of external devices.

The method of providing recommended images will be described in more detail with reference to the accompanying drawings. First, the controller 180 of the mobile terminal disclosed herein may output on the display unit 151 a preview image corresponding to image data received from at least one of a plurality of external devices when the plurality of external devices, for example, a first external device, a second external device, a third external device and a fourth external device are in a communication-connected state with the mobile terminal.

Figure 9A:
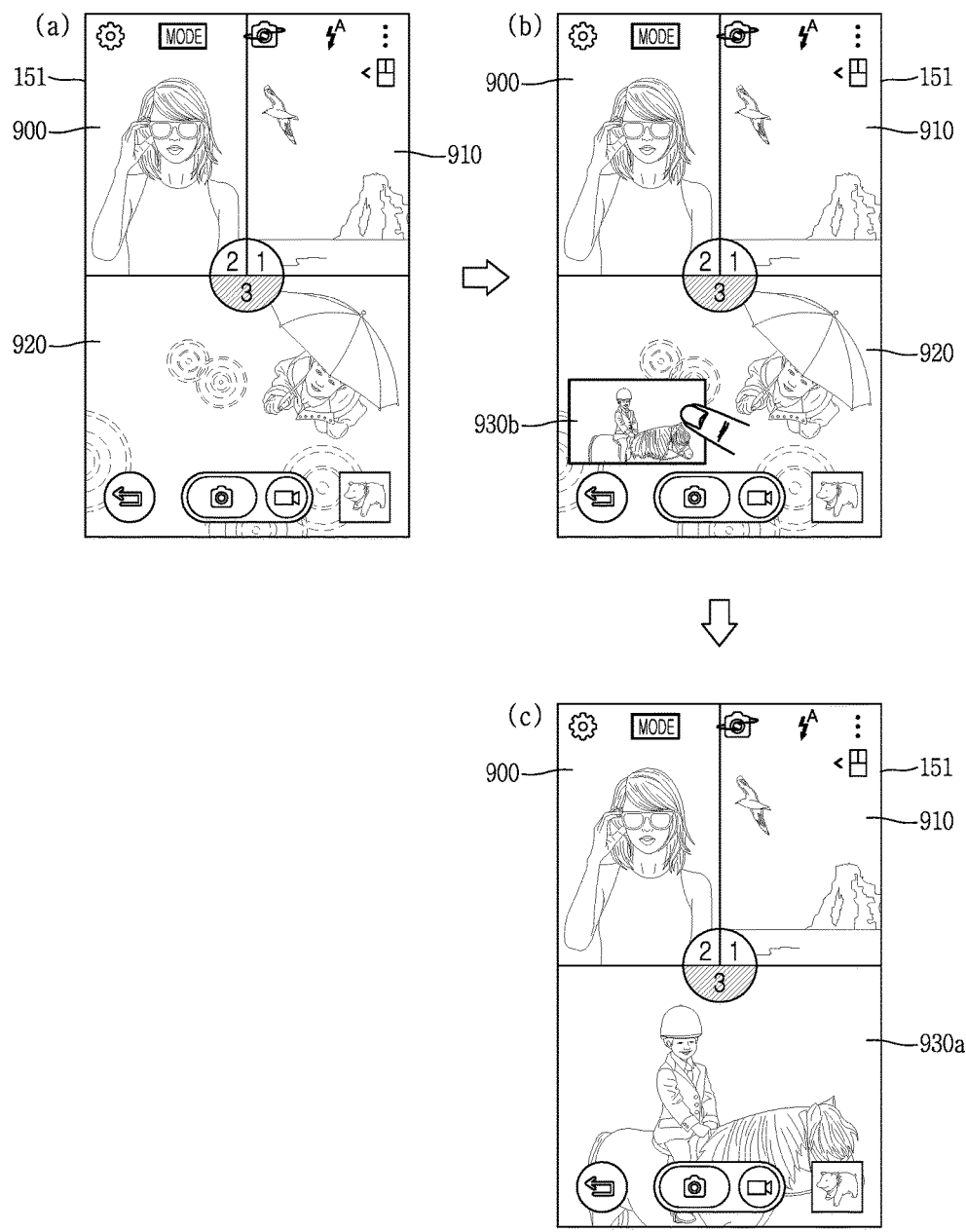
FIGS. 9A to 10C are conceptual views illustrating a method of providing a recommended image.

For example, as illustrated in (a) of FIG. 9A, the display unit 151 may output thereon a preview image 900 corresponding to image data received from the camera 121 of the mobile terminal, a preview image 910 corresponding to image data received from the first external device, and a preview image 920 corresponding to image data received from the second external device.

In this instance, the controller 180 can detect an external device meeting a preset condition, of the third and fourth external devices whose preview images are not currently output on the display unit 151. When the external device meeting the preset condition is detected, the controller 180 can output on the display unit 151 a thumbnail image of a preview image corresponding to image data received from the detected external device as a recommended image.

For example, as illustrated in (b) of FIG. 9A, when a specific subject is included in the image data received from the third external device, the controller 180 can display on the display unit 151 a thumbnail image 930*b* of a preview image corresponding to the image data received from the third external device. In this instance, the user can recognize through the thumbnail image 930*b* that capturing of the image data received from the third external device is currently recommended.

Afterwards, as illustrated in (c) of FIG. 9A, the controller 180 can output on the display unit 151 a preview image 930*a* corresponding to the image data received from the third external device, in response to a touch input applied to the thumbnail image 930*b*. In this instance, the preview image 920 corresponding to the image data received from the second external device of the previously-output preview images may disappear from the display unit 151. That is, the user can select the recommended image and capture the recommended image instead of the previously-output preview image.

Figure 9B:
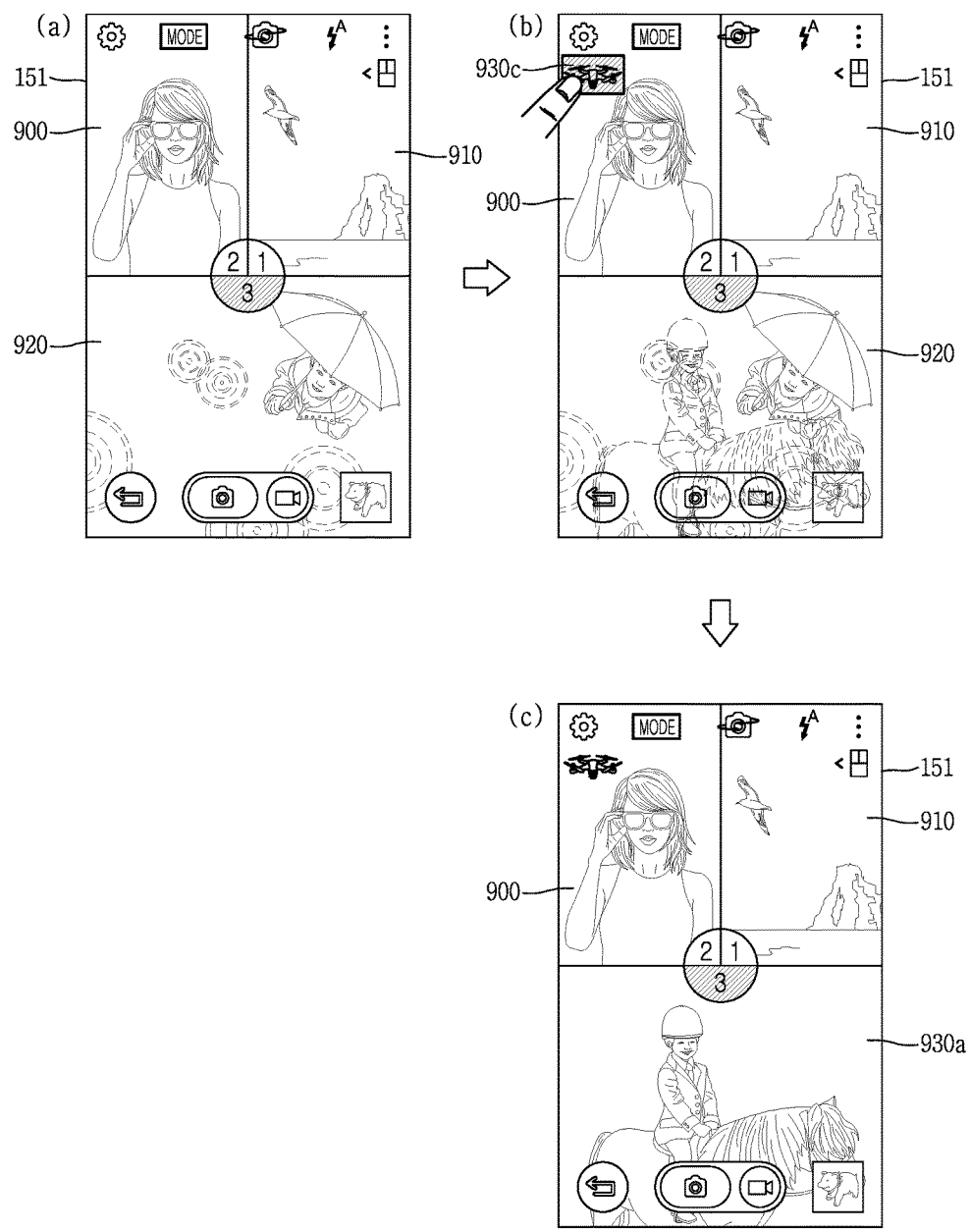

Meanwhile, as illustrated in (b) of FIG. 9B, the controller 180 can output the preview image corresponding to the image data received from the third external device by overlapping the preview image 920 corresponding to the image data received from the second external device, and separately output an icon 930*c* corresponding to the third external device.

As illustrated in (c) of FIG. 9B, the user can select the icon 930*c* corresponding to the third external device and output the preview image 930*a* corresponding to the image data received from the third external device on the display unit 151.

In addition, while the preview image corresponding to the image data received from the third external device is output in the overlapping manner, when a separate user input is not received until a predetermined time elapses, the controller 180 can control the preview image corresponding to the image data received from the third external device to automatically disappear from the display unit 151.

The controller 180 can provide recommended images when an external device meeting a preset condition is detected, but alternatively always provide recommended images on a second display unit. That is, the mobile terminal disclosed herein may include two display units 151. As illustrated in (a) of FIG. 9C, the mobile terminal disclosed herein may include not only the first display unit 151 but also a second display unit 151*b* connected to the first display unit 151.

The first display unit 151 and the second display unit 151*b* may be configured as one display unit or separate display units. Also, the first display unit 151 and the second display unit 151*b* may be controlled independent of each other. In this specification, the first display unit 151 is referred to as a display unit 151, unless otherwise specified, and the terms of the first and second display units 151 and 151*b* are used when the second display unit 151*b* is present.

Figure 9C:
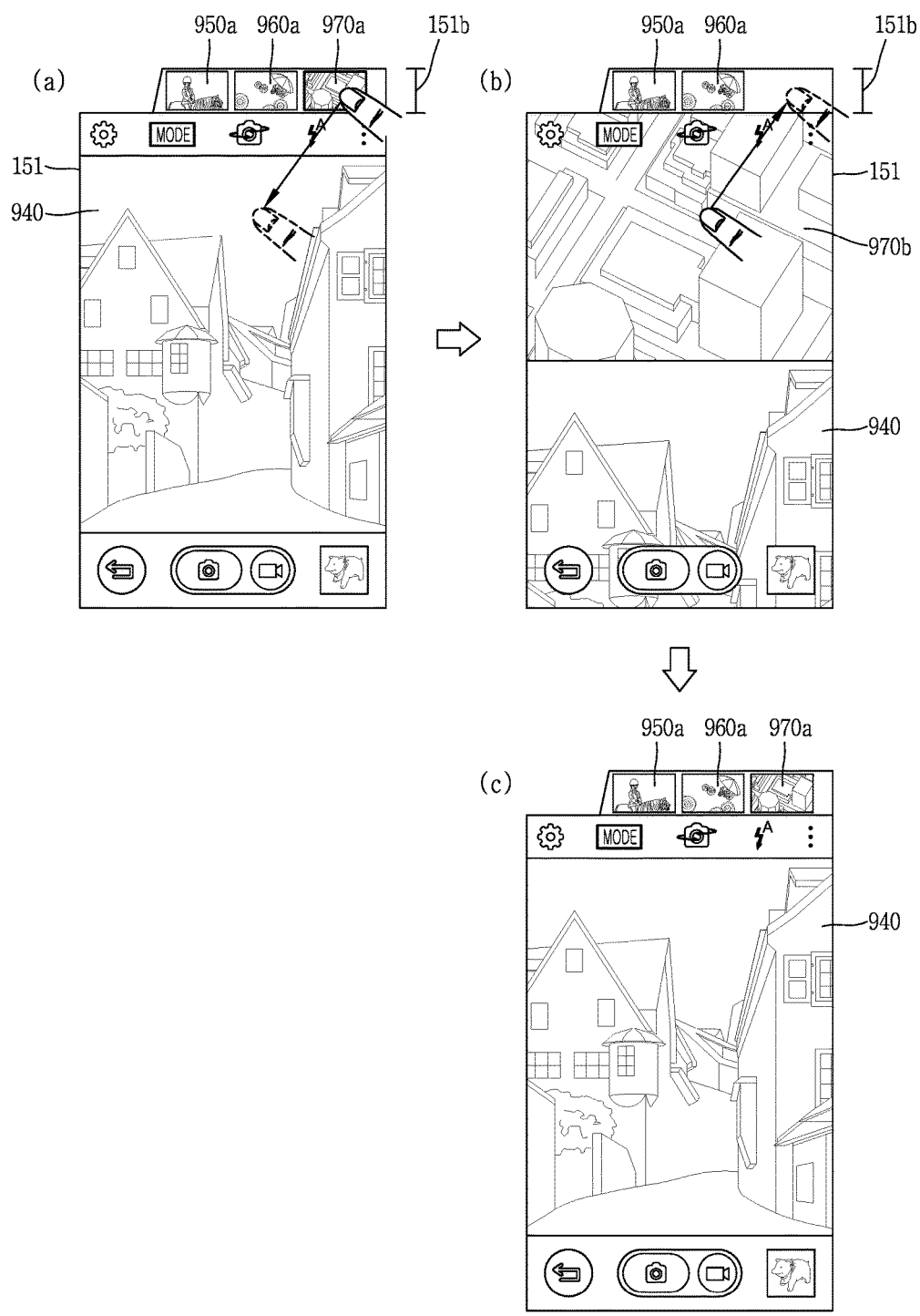
Figure 9D:
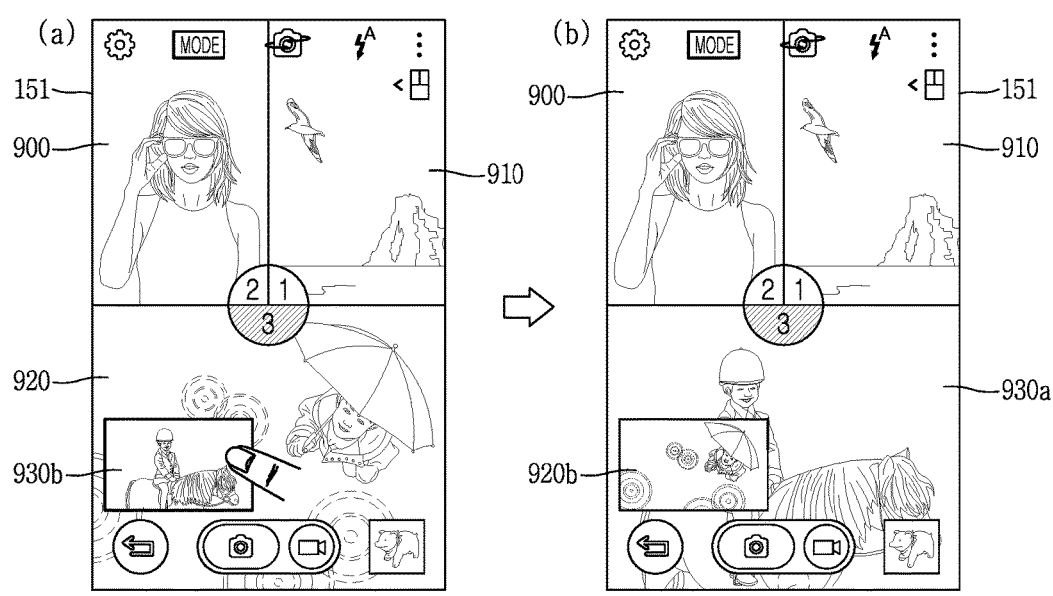

As illustrated in (a) of FIG. 9C, when the mobile terminal disclosed herein includes the second display unit 151*b*, the controller 180 can output on the second display unit 151*b* thumbnail images 950*a*, 960*a* and 970*a* of preview images corresponding to image data received from communication-connected external devices.

The thumbnail images 950*a*, 960*a* and 970*a* of the preview images output on the second display unit 151*b* may be all of image data received from a plurality of communication-connected external devices, or image data received from at least one external device meeting a preset condition of the plurality of communication-connected external devices.

Meanwhile, as illustrated in (b) of FIG. 9C, the controller 180 can output a specific preview image 970*b* corresponding to a specific thumbnail image on the first display unit 151, in response to a drag input applied to an output area of a specific thumbnail image 970*a*, among those thumbnail images 950*a*, 960*a* and 970*a* of the preview images output on the second display unit 151*b*, and dragged toward the first display unit 151. Simultaneous to this, the controller 180 can switch the display mode from the first mode into the second mode for outputting the specific preview image 970*b*.

As illustrated in (b) of FIG. 9C, the display unit may output the specific preview image 970*b* together with an originally-output preview image 940. On the contrary, as illustrated in (b) of FIG. 9C, when a drag input is applied to the output area of the specific preview image 970*b* and dragged toward the second display unit 151*b*, the controller 180 can output the thumbnail image 970*a* of the specific preview image 970*b* on the second display unit 151*b* and control the specific preview image 970*b* to disappear from the first display unit 151. That is, the user can decide whether or not to output a preview image by applying an intuitive drag input.

Meanwhile, when the user selects a recommended image, the controller 180 can control a previously-output image to disappear from the display unit 151, but alternatively continuously provide the image in the form of a thumbnail image. For example, as illustrated in (a) of FIG. 9D, when the user selects as a recommended image the thumbnail image 930*b* of the preview image of the image data received from the third external device, the controller 180 can output the preview image of the image data received from the third external device on the display unit 151, instead of the preview image 920 of the image data received from the second external device. Simultaneous to this, as illustrated in (b) of FIG. 9D, the controller 180 can output a thumbnail image of the preview image of the image data received from the second external device. Therefore, the user can continuously check previously-output preview images even though selecting a recommended image.

When a thumbnail image is provided as a recommended image, the controller 180 can perform various controls associated with the thumbnail image in response to a user input. For example, as illustrated in (a) of FIG. 10A, the controller 180 can sense a drag input applied to a boundary area of the thumbnail image 930*b*. As illustrated in (b) of FIG. 10A, the controller 180 can increase a size of the thumbnail image 930*b* as great as a dragged length of the drag input.

Figure 10A:
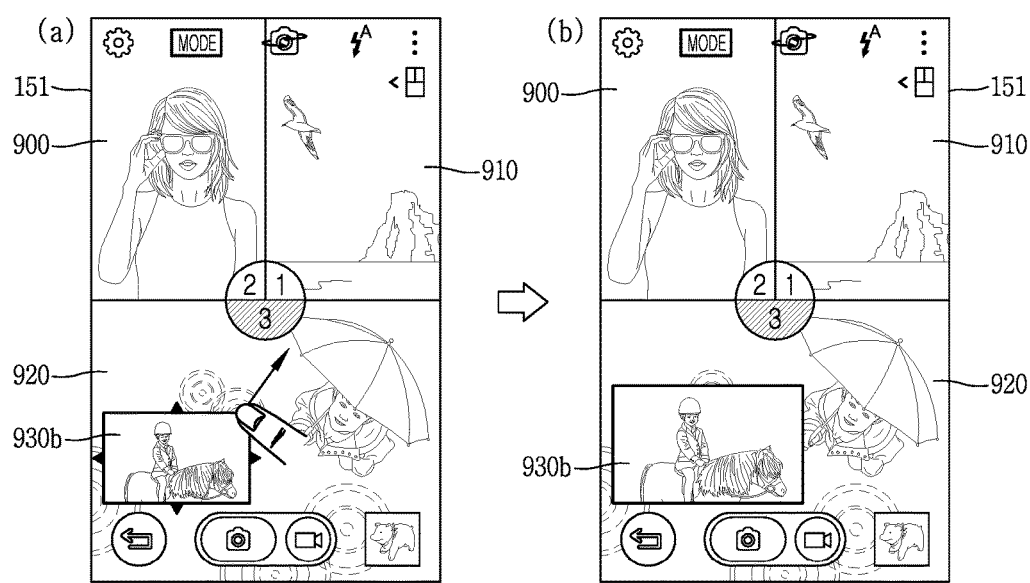
Figure 10B:
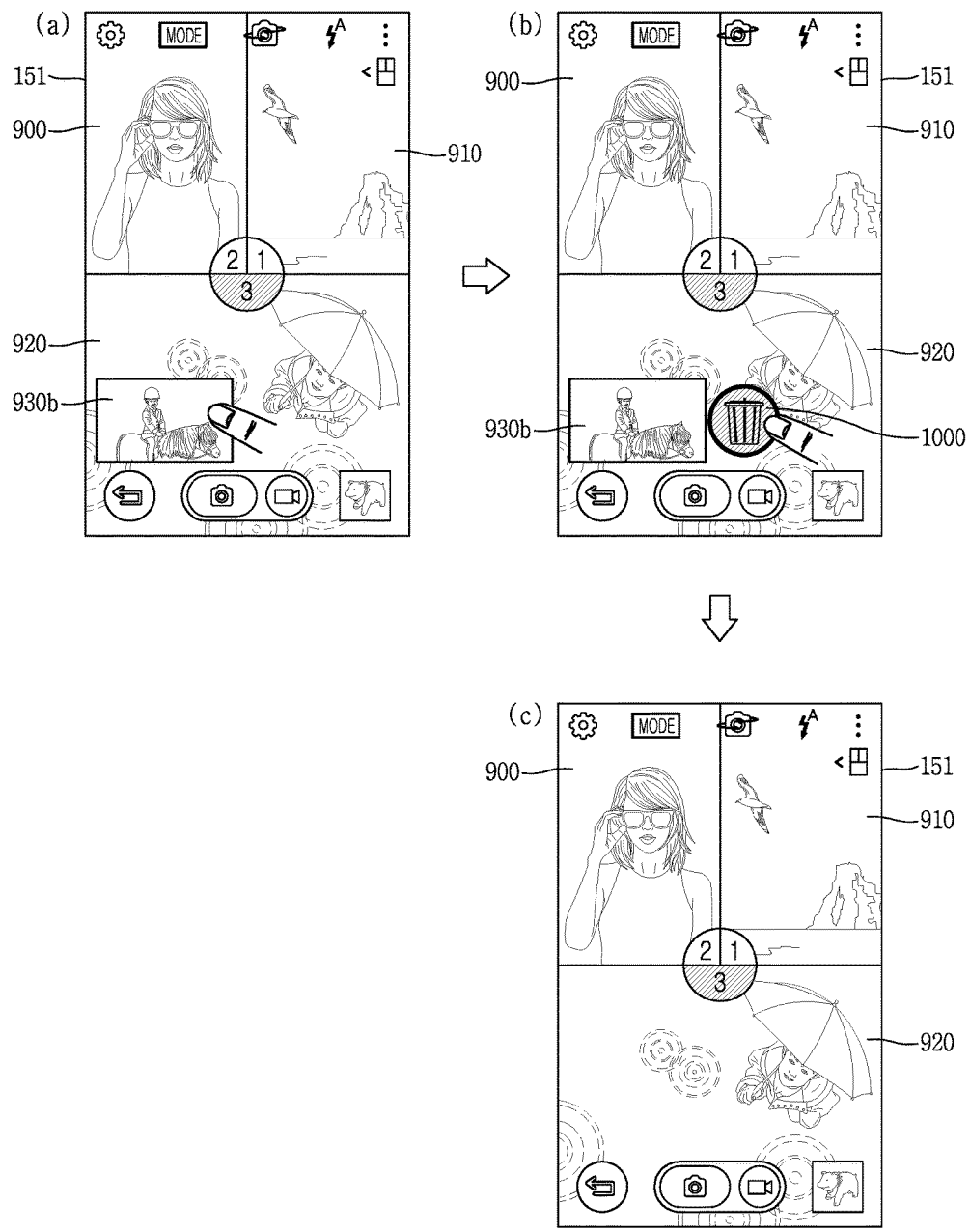

As another example, as illustrated in (a) of FIG. 10B, the controller 180 can sense a long touch applied to the thumbnail image 930*b*. As illustrated in (b) of FIG. 10B, the controller 180 can output a wastebasket image 1000 on an area adjacent to the output area of the thumbnail image 930*b*. The wastebasket image 1000 is a graphic object associated with a thumbnail image delete function. As illustrated in (c) of FIG. 10B, when a touch input is applied to the wastebasket image 1000, the controller 180 can control the thumbnail image 930*b* to disappear from the display unit 151.

Figure 10C:
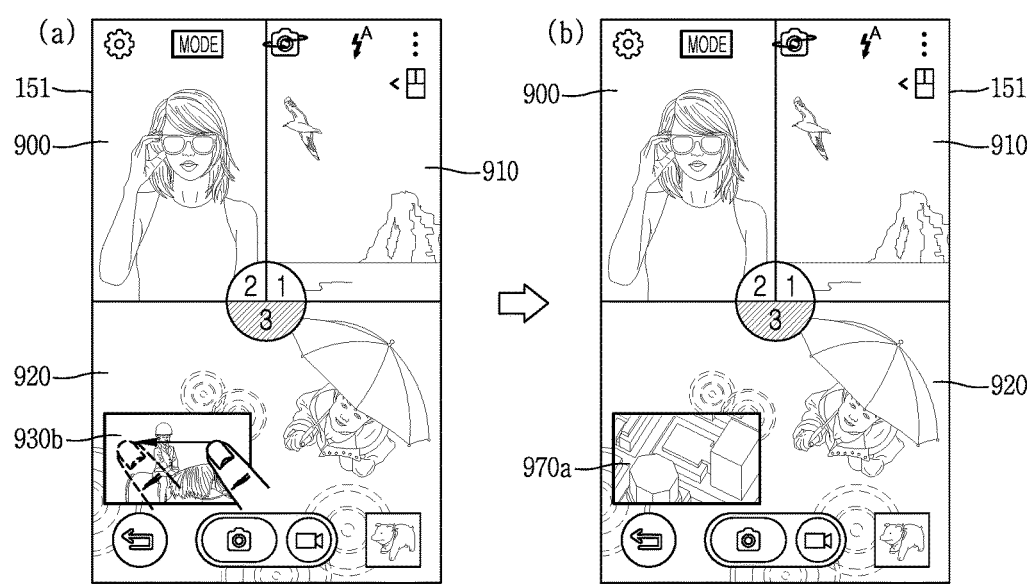

As another example, as illustrated in (a) of FIG. 10C, the controller 180 can sense a flicking touch applied to the thumbnail image 930*b*. As illustrated in (b) of FIG. 10C, the controller 180 can switch the thumbnail image 930*b* into another thumbnail image 970*a*. Here, the another thumbnail image 970*a* may be a thumbnail image of a preview image of an external device which has been detected by the controller 180 as a device currently receiving recommended images. That is, when a plurality of images are detected as recommended images, the controller 180 can sequentially provide the plurality of images through a flicking touch.

The foregoing description has been given of a method of providing recommended images in the mobile terminal according to an embodiment of the present invention. This allows the user to receive images appropriate for his/her situation as recommended images even without directly checking image data received from external devices.

Hereinafter, description will be given of a method of setting a layout providing a plurality of preview images in the second mode. FIGS. 11A to 11D are conceptual views illustrating embodiments of setting a layout of preview images in the second mode. The following description will be given, for the sake of explanation, under assumption that the mobile terminal is in a communication-connected state with a plurality of external devices, and an output mode has been set as the second mode.

Figure 11A:
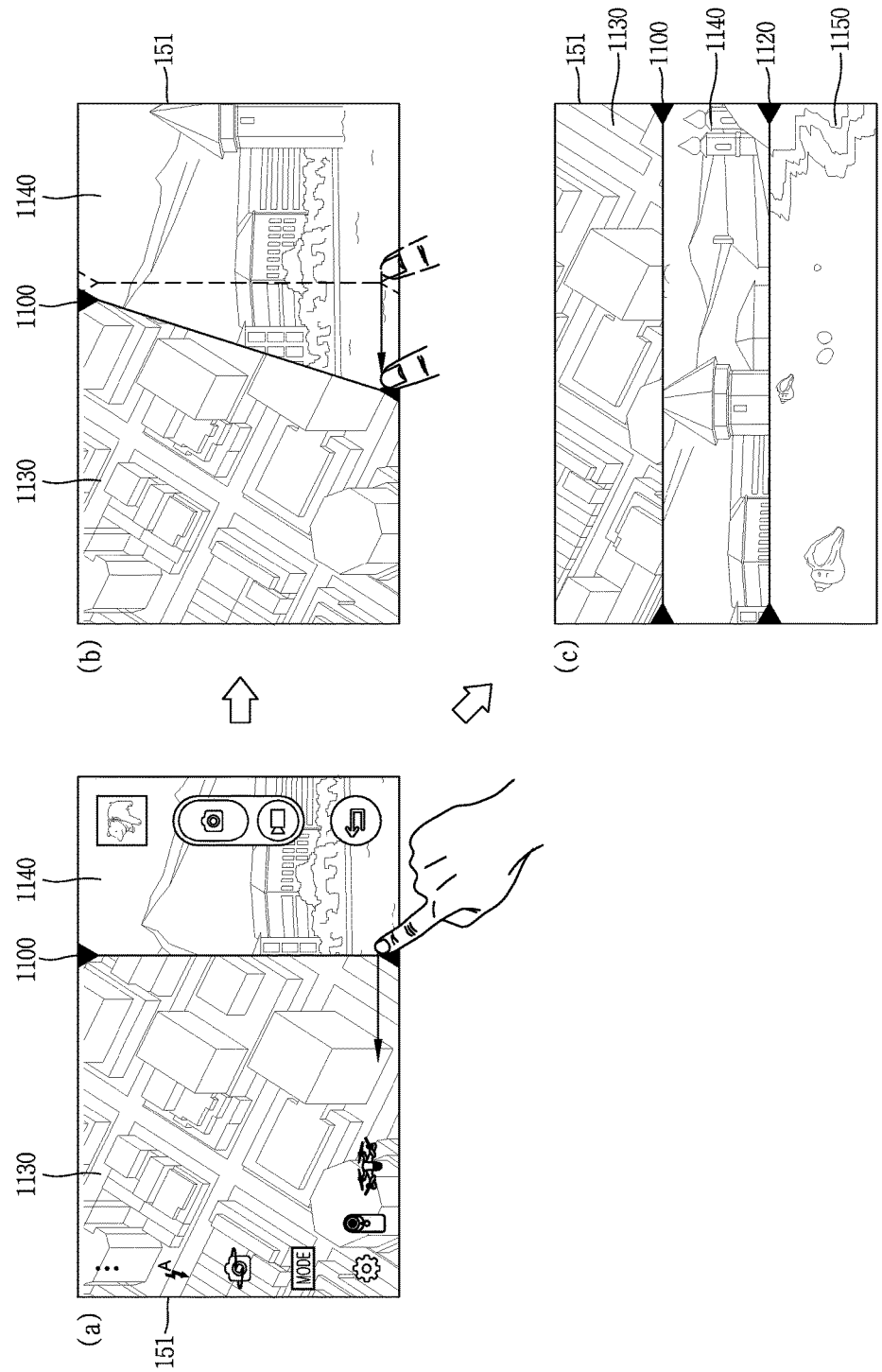
Figure 11B:
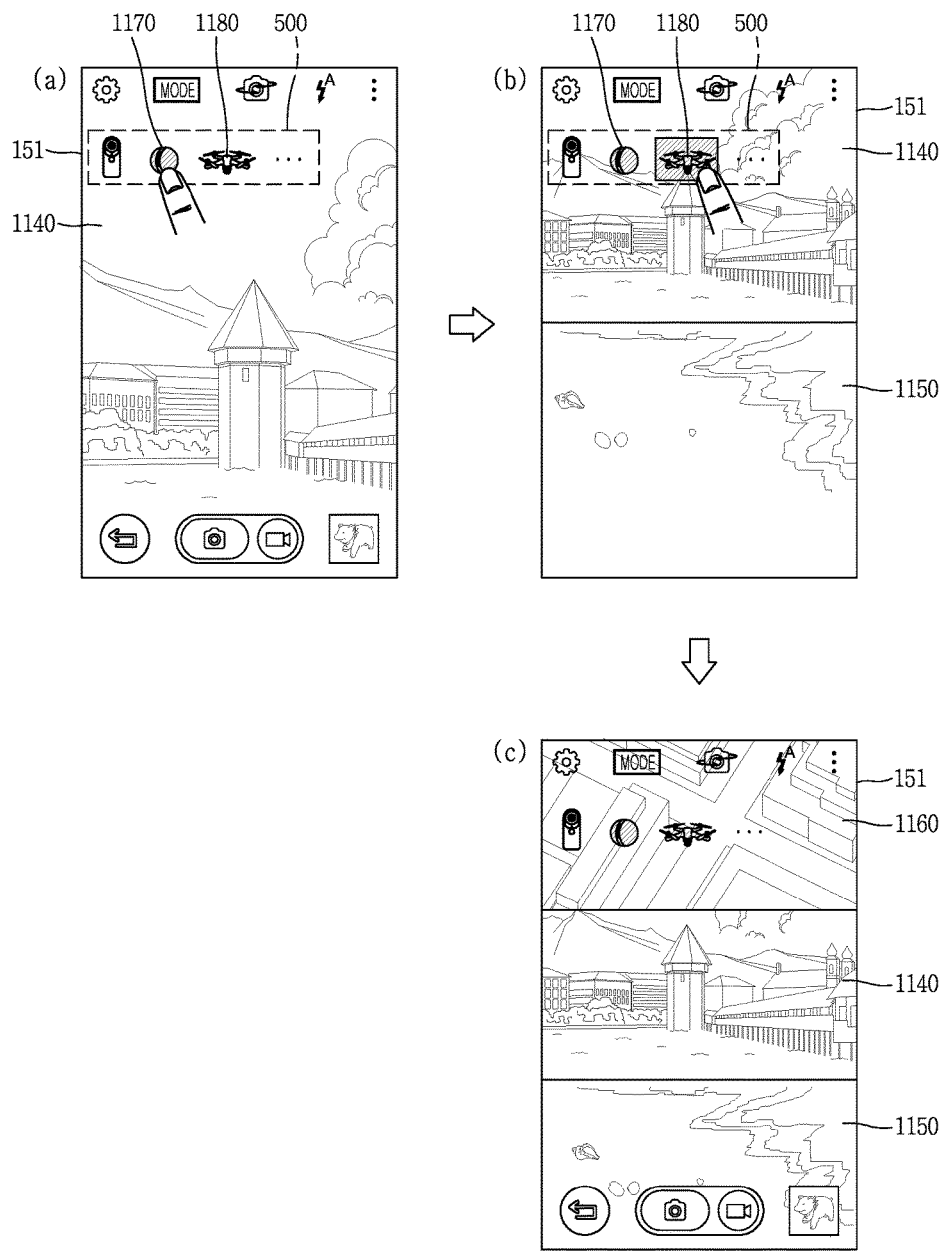

The controller 180 of the mobile terminal disclosed herein may set a layout for outputting preview images based on a preset condition. The layout refers to a form of outputting the preview images on the display unit. For example, FIG. 11A illustrates a layout of outputting preview images by vertically dividing an output area, and FIG. 11B illustrates a layout of outputting preview images by horizontally dividing an output area.

The layout may be changed by a user input. For example, as illustrated in (a) of FIG. 11A, the controller 180 can output a graphic object 1100 for changing a layout on a boundary between two areas in a layout divided into the two areas. As illustrated in (b) of FIG. 11A, the controller 180 can change the layout, in response to a drag input applied to the graphic object 1100. In addition, as illustrated in (c) of FIG. 11A, the controller 180 can change the layout divided into the two areas into a layout divided into three areas. In this instance, on the newly-generated area can be output a preview image which has not been output before the change of the layout.

Also, the layout may be set based on a preset condition. The controller 180 can set a layout based on a preset condition. The preset condition may be a condition associated with at least one of a number of preview images to be output, characteristic information related to an external device, a location of an external device and characteristic information related to a preview image.

The characteristic information related to the external device is information related to an operation characteristic of the external device, for example, information related to whether the external device is an external device moving on a ground or a flying external device. Also, the characteristic information related to the external device includes information related to whether or not the external device is an external device capturing a subject at 360°. The location of the external device is a relative position based on the mobile terminal. The characteristic information related to the preview image may be information related to whether a subject included in a preview image is either a person-based subject or a background-based subject.

For example, as illustrated in (a) to (c) of FIG. 11B, in case of having to display a preview image 1160 corresponding to image data received from a first external device 1180 (e.g., drone) which is currently flying, and a preview image 1150 corresponding to image data received from a second external device 1170 (e.g., a rolling bot) moving on the ground, the controller 180 can set a layout in which the preview image 1160 corresponding to the image data received from the first external device is located on an upper area of the display unit 151, and the preview image 1150 corresponding to the image data received from the second external device is located on a lower area of the display unit 151.

Similarly, the controller 180 can output preview images corresponding to image data received from external devices, which are located at left and right sides of a location of the mobile terminal, on left and right areas of the display unit 151. That is, the present invention can provide preview images of image data received from external devices in a style of forming a single image, by putting the preview images together into such single image, like a panoramic image.

Also, the controller 180 can change a layout when the communication connection with an external device is released while outputting a preview image corresponding to image data received from the external device. For example, as illustrated in (a) of FIG. 11C, while outputting three preview images 1130, 1140 and 1150 to be aligned with the layout divided into three areas, a communication connection with an external device which has transmitted the specific preview image 1140 may be released.

As illustrated in (b) of FIG. 11C, the controller 180 can change the layout divided into the three areas into a layout divided into two areas, to output the rest of preview images 1130 and 1150 still continuing the communication connection. Also, when there is a preview image corresponding to image data received from an external device to which a voice input has been applied while a plurality of preview images are output, the controller 180 can change a layout to increase a size of an output area of the preview image.

For example, as illustrated in (a) of FIG. 11D, on the display unit 151 can be output a preview image 1200 corresponding to image data input from the camera 121, a preview image 1210 received from a first external device, and a preview image 1220 received from a second external device. In this instance, when a voice input applied to the second external device is sensed, the controller 180, as illustrated in (b) of FIG. 11D, may increase a size of an output area of the preview image 1220 of the second external device. Similarly, as illustrated in (c) of FIG. 11D, when a voice input is applied to the mobile terminal, the controller 180 can increase the size of the preview image 1200. Accordingly, the user can pay attention to the preview image whose output area has increased in size, so as to more intuitively recognize the image that the user has to capture.

In addition, the controller 180 can set a layout of preview images according to characteristic information related to the preview images. For example, the controller 180 can set a layout to output preview images including a background-based subject on a horizontally-long area, while setting a layer to output preview images including a person-based subject on a vertically-long area.

Figure 12:
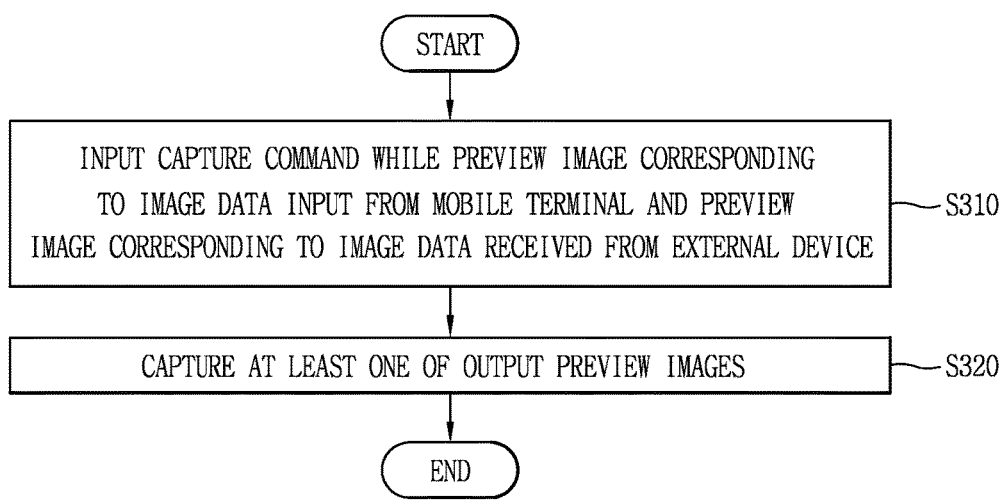
FIG. 12 is a flowchart illustrating a method of capturing an image using cameras of a mobile terminal and external devices.

FIG. 12 is a flowchart illustrating a method of capturing an image using cameras of a mobile terminal and an external device, and FIGS. 13A to 15D are conceptual views illustrating the control method of FIG. 12. The mobile terminal disclosed herein can capture an image using cameras of the mobile terminal itself and an external device.

First, referring to FIG. 12, the controller 180 can receive a capture command while a preview image corresponding to image data input from the mobile terminal and a preview image corresponding to image data received from the external device are output (S310). The controller 180 can receive a capture command input by the user. The capture command refers to a control input for capturing an image.

The capture command may be input in various manners, such as gesture, touch, hovering and the like. The capture command is generated to capture various types of images, such as a video, a still image, a moving image and the like, according to a preset capturing mode. For example, when a capture command is applied in a video capturing mode, the capture command may be set to capture a video. Further, when a capture command is applied in a still image capturing mode, the capture command may be set to capture a still image.

When the capture command is applied, the controller 180 can capture at least one image of preview images output on the display unit 151 based on the capture command (S320). The controller 180 can receive image data from a plurality of external devices, but the images to be captured based on the capture command may be images whose preview images are output on the display unit 151. That is, the present invention may set cameras of the external devices, of which preview images are output on the display unit 151, as capture target cameras, and capture images using the capture target cameras.

That is, even though the mobile terminal receives image data from an external device through communication connected with the external device, when a preview image corresponding to the image data is not output on the display unit 151, image capturing may not be performed based on the capture command. However, the present invention is not limited to this. Image capturing can alternatively be set to be always performed according to a user selection if a communication is connected even though a preview image is not output.

The following embodiments will be described under assumption that only images with preview images thereof output on the display unit are targets to be captured. The controller 180 can capture images in various manners. For example, the controller 180 can capture images simultaneously or sequentially by using cameras provided in a plurality of external devices and the mobile terminal, in response to one capture command.

Figure 13A:
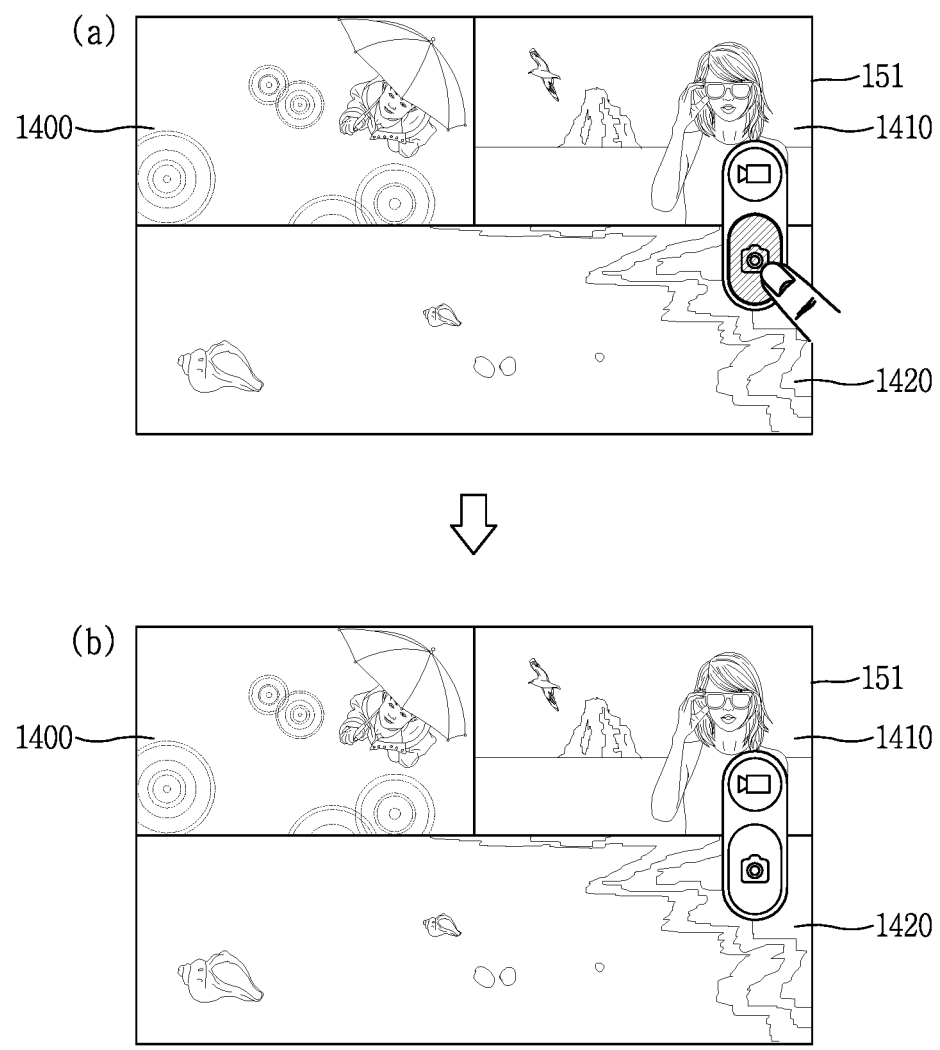
FIGS. 13A to 15B are conceptual views illustrating the control method of FIG. 12.

As illustrated in (a) of FIG. 13A, upon a reception of a capture command, the controller 180 can capture preview images output on the display unit 151 continuously, sequentially, or with a preset time interval. For example, when the capture command is applied, the controller 180 can sequentially capture a first preview image 1400, a second preview image 1410 and a third preview image 1420 output on the display unit 151 in a sequential manner or in a simultaneous manner at an applied time point of the capture command.

As another example, when the capture command is applied, the controller 180 can sequentially capture the first preview image 1400, the second preview image 1410 after a lapse of a time ta, and the third preview image 1420 after a lapse of the time ta. Meanwhile, the controller 180 can selectively capture only some preview images (e.g., the preview image 1400) of the first preview image 1400, the second preview image 1410 and the third preview image 1420 output on the display unit 151. For example, as illustrated in (a) of FIG. 13B, when a touch input is applied to the first preview image 1400, the controller 180 can capture only a first image 1400a corresponding to the first preview image 1400.

Figure 13C:
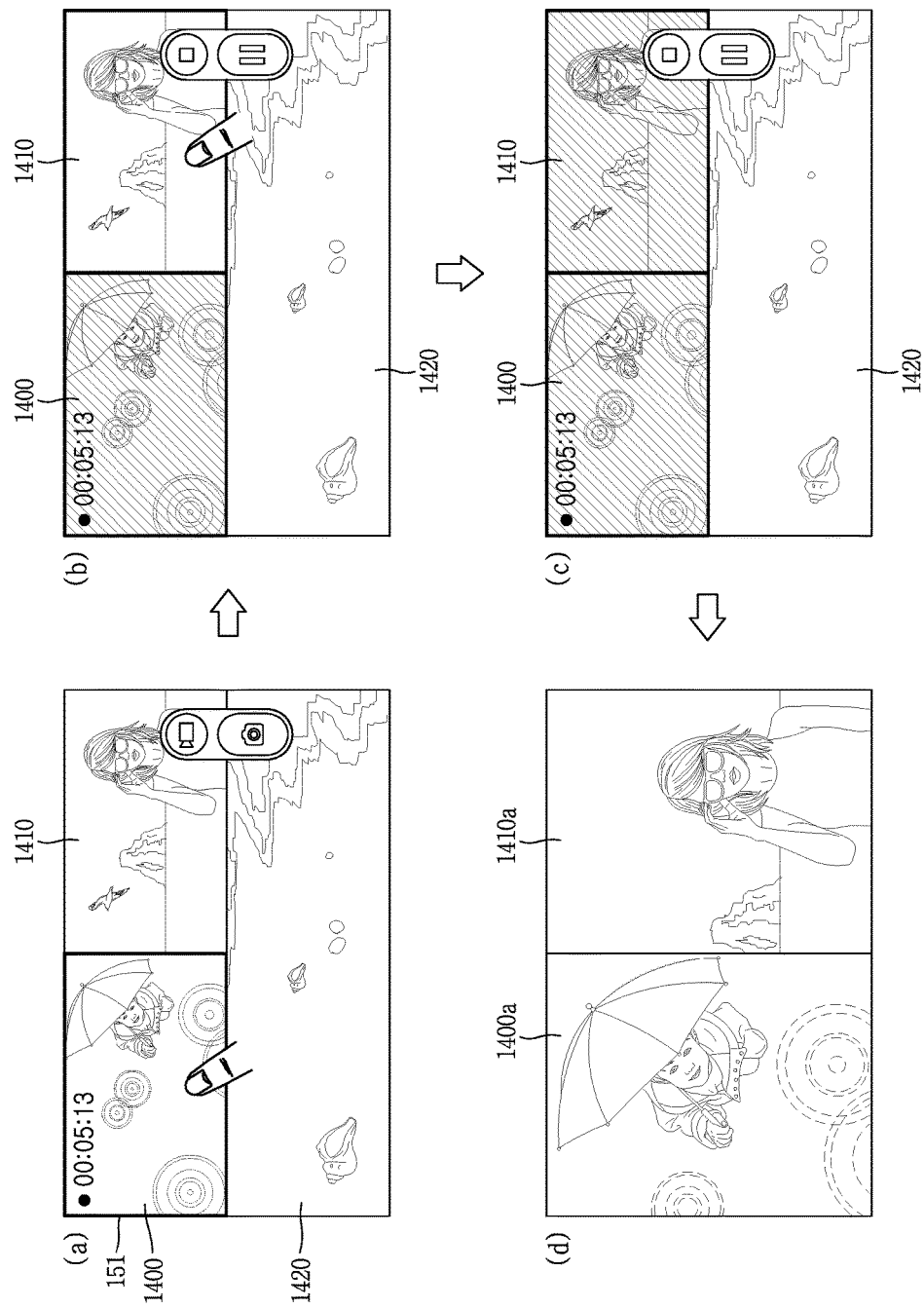

Also, as illustrated in FIG. 13C, the controller 180 can capture a first image 1400a and a second image 1410a by selecting the first preview image 1400 and the second preview image 1410 from the first preview image 1400, the second preview image 1410 and the third preview image 1420. The controller 180 can also capture a video using the first preview image 1400, the second preview image 1410 and the third preview image 1420 according to whether or not a voice input has been input.

In this instance, the controller 180 can capture a video in various manners. In more detail, the controller 180 can set capture target cameras for a video according to a user selection or a preset condition. Here, the preset condition may be a condition that a voice input is received, a condition that a specific subject is included in a preview image, and the like.

For example, the controller 180 can select the first preview image of the plurality of preview images after a capture command for capturing a video is applied. In this instance, the controller 180 can capture the video using the first preview image. While capturing the video using the first preview image, the controller 180 can stop the video capturing using the first preview image and start to capture the video using the second preview image, in response to an input selecting the second preview image being applied. In this instance, the captured videos may be stored individually or generated into one continuous video. When the videos are stored individually, each video can be output together with an indicator indicating the presence of a video captured along therewith.

Figure 13D:
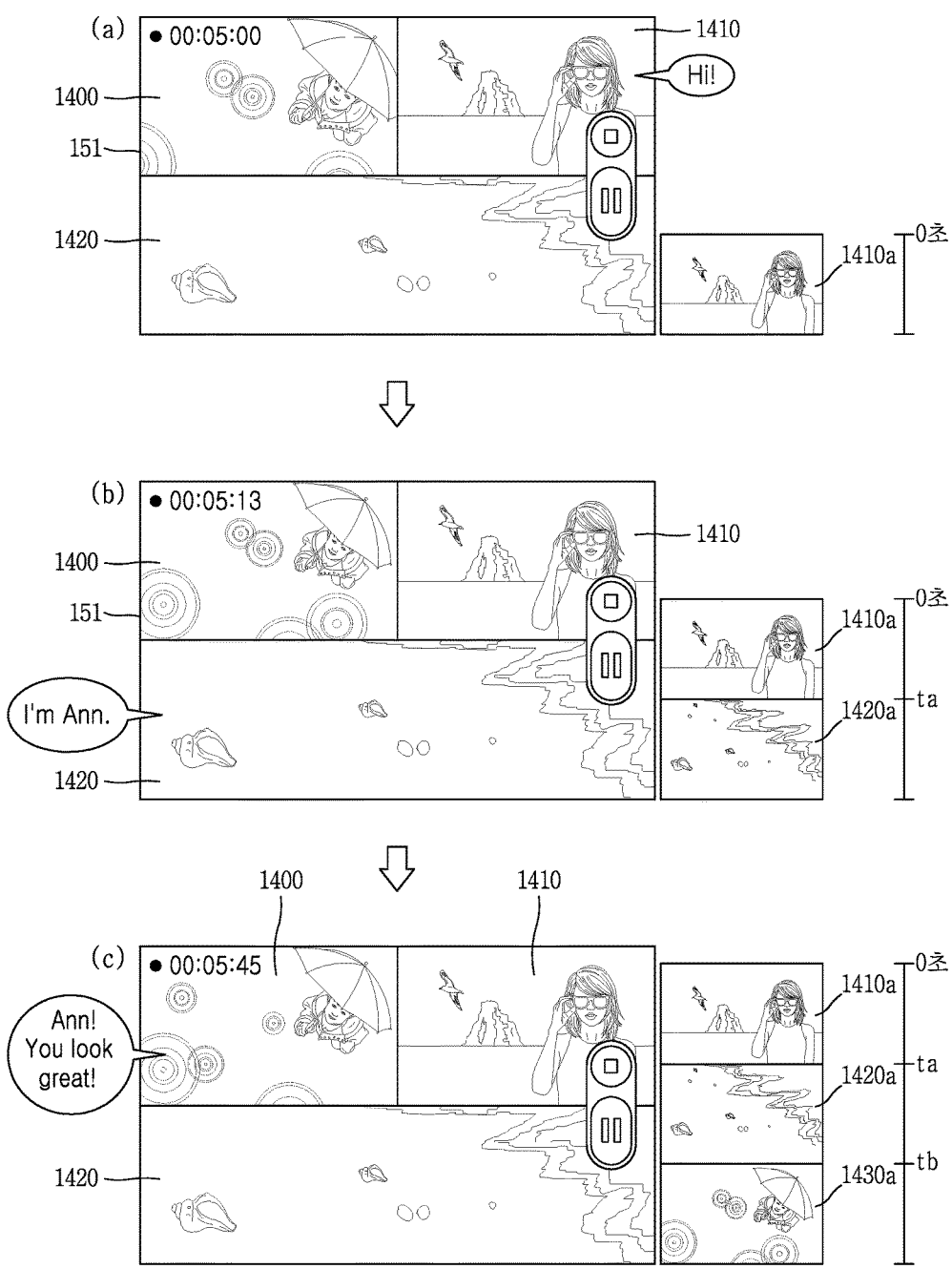

As another example, as illustrated in (a) of FIG. 13D, when a voice input is applied to an external device which has transmitted the second preview image 1410, the controller 180 can capture the video using the second video image 1410. While capturing the video using the second preview image 1410, when a voice input is applied at a time to (second(s)) to the external device which has transmitted the third preview image 1420, the controller 180 can stop the capturing of the video using the second preview image 1410 and start to capture another video using the third preview image 1420, continuous to the video captured using the second preview image 1410. That is, the controller 180 can capture the video using the second preview image 1410 for seconds from 0 to ta, and capture the video using the third preview image 1420 after the time ta (second(s)).

Similar to this, while capturing the video using the third preview image 1420, when a voice input is applied at a time tb (second(s)) to an external device which has transmitted the first preview image 1400, the controller 180 can capture the video using the first preview image 1400. That is, the controller 180 can capture the video using the third preview image 1420 for seconds from ta to tb, and capture the another video using the first preview image 1400 after the time tb (second(s)).

Figure 15A:
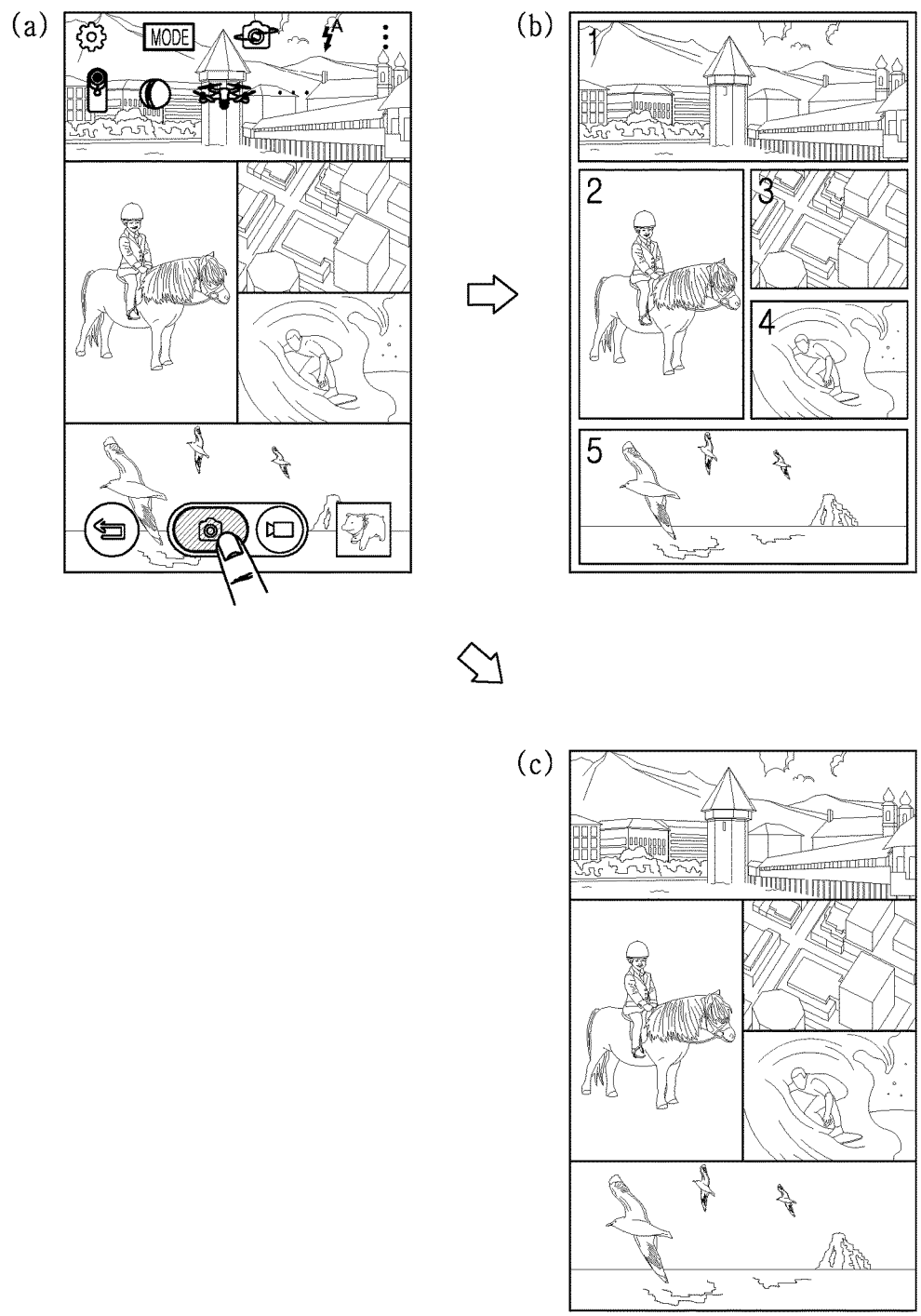

After the completion of the video capturing, the controller 180, as illustrated in FIG. 15B, may reproduce the videos when a user input is applied. For example, as illustrated in (a) of FIG. 15B, the controller 180 can first reproduce the first video captured by the first external device, the second video captured by the second external device after a time ta, and the third video captured by the third external device after a time tb, in a sequential manner.

Further, the controller 180 can store the videos captured using each preview image as separate videos. In this instance, each individual video can be output together with an indicator indicating the presence of videos captured along therewith.

Accordingly, the present invention can capture videos by switching the video-capturing cameras automatically according to a voice input, even without a user input. As another example, the controller 180 can capture a video while tracking a specific subject, not in response to a voice input. For example, when a specific subject is included in a first preview image, the controller 180 can capture a video using the first preview image. During this, when the specific subject is moved into a second preview image, the controller 180 can continuously capture the video using the second preview image.

Meanwhile, the present invention can perform timelaps capturing of storing continuously-captured images into a format of one moving image using cameras of external devices, or perform slow-motion capturing by arbitrarily controlling a capturing time of the video. This allows the user to generate a video which is more appropriate for the user's environment.

Figure 14:
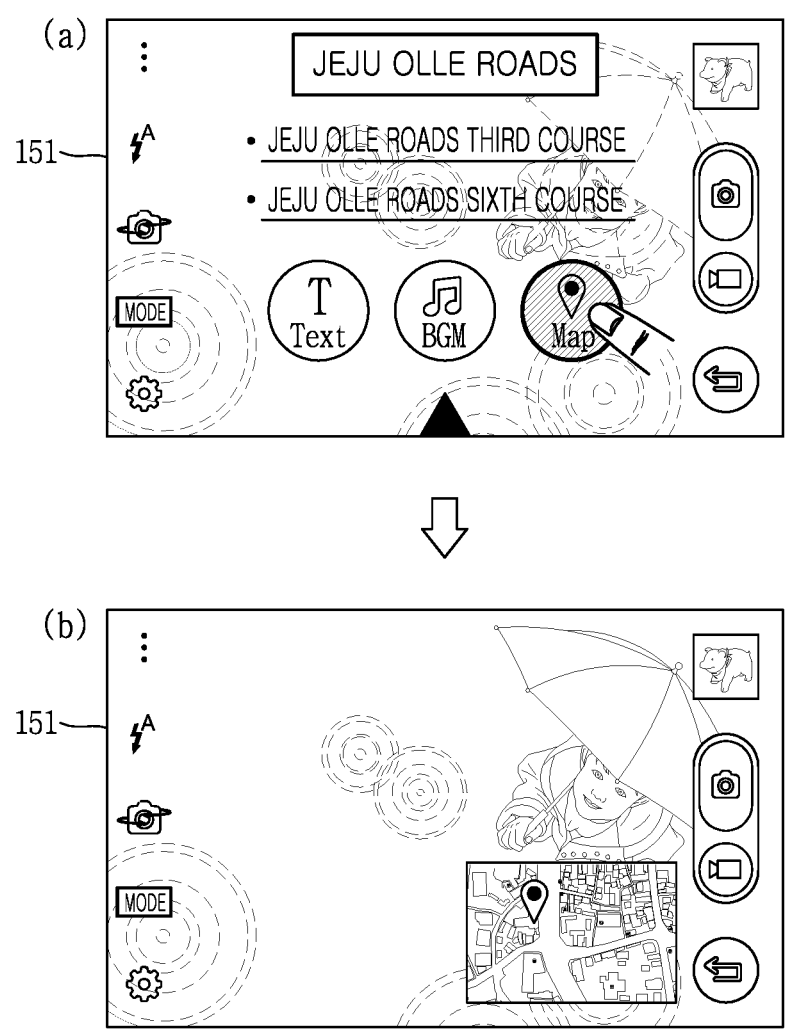

In addition, the controller 180 can store an image captured by each external device by associating with a position at a capturing time point of each external device, during the image capturing using a plurality of external devices. For example, as illustrated in FIG. 14, the controller 180 can output images captured by external devices at positions on map information, respectively.

The description has been given based on position information, but the present invention may not be limited to this. Alternatively, background music, text information and the like may be inserted in the same manner. When at least one image is captured by a capture command, the controller 180 can merge the at least one image into one merged image (a type illustrated in (c) of FIG. 15), or store the at least one image as a separate image (a type illustrated in (c) of FIG. 15).

The merged image may have a form which is the same as the output form of the preview images. That is, the user can perform image capturing by setting a merged shape of a merged image when preview images are output. In addition, editing a form of a merged image after capturing images and sharing the captured images with external devices can be applied through general technologies.

The mobile terminal according to an embodiment of the present invention can extend a camera function of the mobile terminal using cameras provided in external devices and the mobile terminal and can provide preview images of cameras provided in external devices and the mobile terminal in appropriate forms, thereby providing an intuitive user interface. This allows the user to more intuitively control the external devices of the mobile terminal.

Also, the mobile terminal according to an embodiment of the present invention can capture images through cameras provided in external devices and the mobile terminal. Accordingly, the user can more easily control several cameras using one mobile terminal. In addition, images captured through the several cameras can be more easily edited by the one mobile terminal.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a camera;
   a wireless communication processor configured to provide wireless communication;
   a display unit; and
   a controller configured to:
   display a first preview image on the display unit corresponding to image data input through the camera,
   detect an external device located within a preset range of the mobile terminal via the wireless communication processor,
   display an icon on the display unit corresponding to the detected external device by overlapping the first preview image,
   display a thumbnail image of a second preview image corresponding to image data received from the detected external device on the display unit by overlapping the first preview image, in response to the touch input applied to the icon, while the communication with the detected external device is not connected,
   execute a communication connection with the external device, in response to a touch input applied to the thumbnail image, while the communication with the detected external device is not connected, wherein the display unit is divided into two areas in response to the touch input applied to the thumbnail image, and the first preview image and the second preview image are displayed on the divided two areas respectively, and
   release the communication connection with the external device, in response to the touch input applied to the icon, while the communication with the detected external device is connected.

2. The mobile terminal of claim 1, wherein the controller is further configured to:
   display the icon corresponding to the detected external device on the first preview image when a preset condition is met.

3. The terminal of claim 2, wherein the preset condition is one of a condition that the external device is detected through the wireless communication processor, and a condition that a preset user gesture is input.

4. The mobile terminal of claim 1, wherein the controller is further configured to:
   display the first preview image and the second preview image in one of a first mode and a second mode, and
   wherein the first mode only displays one of the first preview image and the second preview image, and the second mode displays in a preset layout both of the first preview image and the second preview image.

5. The mobile terminal of claim 4, wherein the controller is further configured to:
   display the second preview image, instead of the first preview image, in response to a preset touch input of the first preview image, in the first mode.

6. The mobile terminal of claim 4, wherein the controller is further configured to:
   wirelessly communicate with a plurality of external devices via the wireless communication processor, and
   display in the second mode a preview image corresponding to image data received from at least one of the plurality of external devices in a preset layout, the at least one external device meeting a preset condition.

7. The method of claim 6, wherein the preset condition is one of a condition that the received image data includes a specific subject, and a condition associated with at least one of time, position and voice recognition.

8. The mobile terminal of claim 4, wherein the controller is further configured to:
set the preset layout based on at least one of a number of preview images to be displayed, characteristic information regarding a preview image, characteristic information regarding the external device, and a location of the external device.

9. The mobile terminal of claim 4, wherein the controller is further configured to:
display both of the first preview image and the second preview image in the second mode, and
stop displaying the second preview image, and release the communication connection with the detected external device, when a size of an output area of the second preview is reduced less than a preset size in response to a user input.

10. The mobile terminal of claim 4, wherein the controller is further configured to:
display both of the first preview image and the second preview image in the second mode, and
switch the second mode into the first mode and display only the first preview image, when a size of an output area of the first preview image is increased more than a preset size.

11. The mobile terminal of claim 1, wherein the controller is further configured to:
wirelessly communicate with a plurality of external devices via the wireless communication processor, and
when a corresponding external device meeting a preset condition is detected among the plurality of external devices, display a thumbnail image of a preview image corresponding to image data received from the detected corresponding external device, by overlapping the first preview image.

12. The mobile terminal of claim 11, wherein the preset condition is at least one of a condition that the received image data includes a specific subject, a condition associated with situation information, a condition associated with an attribute of a subject, and a condition that the corresponding external device includes a recognized specific voice.

13. The mobile terminal of claim 1, wherein the controller is further configured to:
capture at least one of a first image corresponding to the first preview image and a second image corresponding to the second preview image, in response to a capture command applied, while the first preview image and the second preview image are displayed.

14. The mobile terminal of claim 13, wherein the controller is further configured to:
capture the first image and the second image in a sequential or simultaneous manner based on a preset condition.

15. The mobile terminal of claim 14, wherein the controller is further configured to:
store the first image and the second image in a form of a merged image or as separate images when the first image and the second image are captured.

16. The mobile terminal of claim 15, wherein the merged image is one of a moving image that the first image and the second image are sequentially output according to a lapse of time, or a still image that the first image and the second image are merged into one image.

17. A method of controlling a mobile terminal, the method comprising:
displaying, via a controller of the mobile terminal, a first preview image on a display unit corresponding to image data input through a camera of the mobile terminal;
detecting, via a wireless communication processor of the mobile terminal, an external device located within a preset range of the mobile terminal;
displaying, via the controller, an icon on the display unit corresponding to the detected external device by overlapping the first preview image;
displaying, via the controller, a thumbnail image of a second preview image corresponding to image data received from the detected external device on the display unit by overlapping the first preview image, in response to the touch input applied to the icon, while the communication with the detected external device is not connected;
executing, via the controller, a communication connection with the external device, in response to a touch input applied to the thumbnail image, while the communication with the detected external device is not connected, wherein the display unit is divided into two areas in response to the touch input applied to the thumbnail image, and the first preview image and the second preview image are displayed on the divided two areas respectively; and
releasing, via the controller, the communication connection with the external device, in response to the touch input applied to the icon, while the communication with the detected external device is connected.

18. The method of claim 17, further comprising:
displaying, via the controller, the icon corresponding to the detected external device on the first preview image when a preset condition is met.

* * * * *